(12) United States Patent
Roy et al.

(10) Patent No.: US 10,601,502 B2
(45) Date of Patent: Mar. 24, 2020

(54) SYSTEMS AND METHODS FOR FLEXIBLE ASSIGNMENT OF BEAMS TO GATEWAYS IN A HIGH THROUGHPUT DIGITAL PAYLOAD SATELLITE NETWORK

(71) Applicant: Hughes Network Systems, LLC, Germantown, MD (US)

(72) Inventors: Satyajit Roy, Germantown, MD (US); George Choquette, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 32 days.

(21) Appl. No.: 15/889,194

(22) Filed: Feb. 5, 2018

(65) Prior Publication Data
US 2019/0245613 A1 Aug. 8, 2019

(51) Int. Cl.
| | | |
|---|---|---|
| *H04B 7/185* | (2006.01) | |
| *H04L 29/12* | (2006.01) | |
| *H04B 7/155* | (2006.01) | |
| *H04B 7/204* | (2006.01) | |
| *H04W 84/06* | (2009.01) | |
| *H04W 88/16* | (2009.01) | |

(52) U.S. Cl.
CPC ......... *H04B 7/18528* (2013.01); *H04B 7/155* (2013.01); *H04B 7/2041* (2013.01); *H04L 61/2007* (2013.01); *H04L 61/2061* (2013.01); *H04L 61/6068* (2013.01); *H04W 84/06* (2013.01); *H04W 88/16* (2013.01)

(58) Field of Classification Search
None
See application file for complete search history.

(56) References Cited

U.S. PATENT DOCUMENTS

| | | | | |
|---|---|---|---|---|
| 8,712,321 B1* | 4/2014 | Dankberg | .......... | H04B 7/18513 455/12.1 |
| 9,887,765 B1* | 2/2018 | Freedman | .......... | H04B 7/18519 |
| 2009/0295628 A1* | 12/2009 | Wilson | .................. | H04B 7/2041 342/356 |
| 2014/0244808 A1* | 8/2014 | Axelrod | ................ | H04L 41/042 709/220 |
| 2015/0158603 A1* | 6/2015 | Marshack | ............ | B64G 1/1085 244/158.4 |
| 2015/0288443 A1* | 10/2015 | Foxworthy | ........ | H04B 7/18582 370/316 |
| 2016/0087713 A1* | 3/2016 | Oderman | ........... | H04B 7/18591 370/319 |
| 2017/0289822 A1* | 10/2017 | Hreha | ................... | H04W 16/28 |

* cited by examiner

*Primary Examiner* — Candal Elpenord
(74) *Attorney, Agent, or Firm* — Sheppard, Mullin, Richter & Hampton LLP

(57) ABSTRACT

The disclosure provides for the flexible assignment of user beams to gateway beams in digital payload satellite systems. A "virtual beam"—a set of data values associating a physical user satellite beam with a Gateway Earth Station ("GW") and used by the GW to service the physical user satellite beam, may be created or defined each time a physical user satellite beam is assigned to a GW. For one physical user beam, a plurality of virtual beams may be created, where each virtual beam corresponds to a GW. The virtual beams may be used to provide for the flexible assignment of user beams to gateway beams in a variety of applications such as GW expansion, physical user beam reassignment from one GW to another GW, diversity operation of terminals, and GW redundancy.

23 Claims, 11 Drawing Sheets

SYSTEMS AND METHODS FOR FLEXIBLE ASSIGNMENT OF BEAMS TO GATEWAYS IN A HIGH THROUGHPUT DIGITAL PAYLOAD SATELLITE NETWORK

BACKGROUND

A typical satellite Internet system comprises subscriber terminals, a satellite, a ground station, and connectivity to the internet. Communication in such a system occurs along two paths: 1) a forward path comprising a path from the internet to the ground station to an uplink to the satellite to a downlink to the subscriber terminal; and 2) a return path comprising an uplink from a subscriber terminal to the satellite to a downlink to the ground station to the internet.

Conventionally, most satellites function as bent pipe satellites. In bent pipe satellite configurations, received uplink signals are amplified, translated to a downlink frequency, amplified again, and transmitted toward earth using a high-gain antenna. In such systems, mappings between user spot beams and gateway spot beams are typically fixed. A given uplink frequency band from a given user spot beam is translated into a given downlink frequency band of a given gateway spot beam, and similarly, a given uplink frequency band from a given gateway spot beam may be translated into a given downlink frequency band of a given user spot beam.

SUMMARY

Embodiments described herein are directed to the flexible assignment of user beams to gateway beams in digital payload satellite systems.

In one implementation, a method of beam assignment in a digital payload satellite network including a first gateway earth station (GW) and a second GW, includes: for the second GW, configuring a virtual beam corresponding to a physical spot beam of the digital payload satellite that serves multiple terminals, where at least during configuration of the virtual beam, the first GW serves the terminals and a digital payload of the satellite directs communications with terminals within the physical spot beam to the first GW; and after configuring the virtual beam for the second GW, serving one or more of the terminals from the second GW, wherein the digital payload of the satellite is configured to direct communications with the one or more terminals within the physical spot beam to the second GW while the second GW serves the one or more of the terminals. The configured virtual beam may include a plurality of virtual beam parameters, the plurality of virtual beam parameters including two or more of: a number and size of inroute and outroute frequency channels, gateway beam and user beam spectrum assignments for inroute and outroute frequency channels, a subscription configuration of virtual network operators (VNOs) served by the physical spot beam, subscription service plans assigned to each of the terminals, IP addresses assigned to each of the terminals, and transmission power and timing correction values associated with each of the terminals.

In implementations, the method further includes: physically deploying the second GW prior to configuring the virtual beam; and performing readiness testing on the second GW to determine that the second GW is ready to serve the physical spot beam, wherein the digital payload of the satellite is reconfigured after performing readiness testing. In particular implementations, a radio frequency transmitter of the second GW is muted during readiness testing, and performing readiness testing includes: redirecting transmissions at the GW to one or more test terminals located at the second GW; and testing inroute and outroute components of the second GW using the one or more test terminals.

In implementations, configuring the virtual beam includes: configuring the second GW to serve the same spectrum of the user spot beam served by the first GW during configuration of the virtual beam. In particular implementations, the method further includes: prior to the second GW serving the one or more of the plurality of terminals, remapping the spectrum of the physical spot beam from the first GW to the second GW.

In implementations, the method further includes: using the configured virtual beam to perform readiness testing on the second GW while the first GW serves the plurality of terminals. In particular implementations, performing readiness testing includes: remapping a portion of the spectrum of the physical spot beam from the first GW to the second GW.

In implementations, configuring the virtual beam includes: configuring the virtual beam at a network management system (NMS); and configuring equipment of the second GW to the virtual beam by loading virtual beam parameters of the virtual beam into the second GW equipment.

In implementations, moving the terminals from the first GW to the second GW: includes: associating the terminals with the second GW; and assigning new IP addresses to the terminals that served on dynamic IP address plans under the first GW. In particular implementations, a subset of the terminals are served on a static IP address plan under the first GW, and an IP address of each of the subset of the terminals does not change when the terminals are moved from the first GW to the second GW. In particular implementations, configuring the virtual beam includes configuring static IP address pools on the second GW that are the same as static IP address pools utilized by the first GW to serve the terminals.

In particular implementations, configuring the virtual beam includes: configuring the second GW to serve additional spectrum provided to the physical spot beam by the digital payload.

In one implementation, a method includes: for a first gateway earth station (GW), configuring a first virtual beam corresponding to a physical spot beam of a digital payload satellite that serves multiple terminals; for a second GW, configuring a second virtual beam corresponding to the physical spot beam; and serving one or more of the terminals from the first GW with the first configured virtual beam or serving one or more of the terminals from the second GW with the second configured virtual beam. The configured first and second virtual beams may each include a plurality of virtual beam parameters, the plurality of virtual beam parameters comprising two or more of: a number and size of inroute and outroute frequency channels, gateway beam and user beam spectrum assignments for inroute and outroute frequency channels, a subscription configuration of virtual network operators (VNOs) served by the physical spot beam, subscription service plans assigned to each of a plurality of terminals served by the spot beam, IP addresses assigned to each of a plurality of terminals served by the spot beam, and transmission power and timing correction values associated with each of a plurality of terminals served by the spot beam.

In implementations, the plurality of virtual beam parameters of the first virtual beam and the second virtual beam each comprise: gateway beam and user beam spectrum assignments for inroute and outroute frequency channels corresponding to the physical spot beam, where the user beam spectrum assignments are the same for the first virtual beam and the second virtual beam. In other implementations, the user beam spectrum assignments are different for the first virtual beam and the second virtual beam.

In implementations, configuring the first virtual beam and configuring the second virtual beam includes: configuring the first virtual beam and the second virtual beam at a network management system (NMS), where the configured first virtual beam and configured second virtual beam are stored at a database of the NMS. In particular implementations, the method further includes: configuring equipment of the first GW to the first virtual beam and equipment of the second GW to the second virtual beam at the NMS, where configuring equipment of the first GW to the first virtual beam includes loading virtual beam parameters of the first virtual beam into the first GW equipment, and where configuring equipment of the second GW to the second virtual beam includes loading virtual beam parameters of the second virtual beam into the second GW equipment.

In implementations, the method further includes: configuring diverse terminals for the first GW and the second GW, wherein the diverse terminals are configured to communicate with the first GW over the physical spot beam using a first frequency carrier and communicate with the second GW over the physical spot beam using a second frequency carrier. In particular implementations, the diverse terminals maintain the same IP address when communicating with the first GW or the second GW. In particular implementations, configuring each of the diverse terminals includes: designating one of the first GW or the second GW as a primary GW; and designating one of the first GW or the second GW as a secondary GW.

In implementations, the method further includes: configuring network security keys corresponding to the physical spot beam at the first GW and the second GW, where the same network security keys are configured at each of the first GW and the second GW.

In one implementation, a system includes: a first satellite gateway earth station (GW) communicatively coupled to a digital payload satellite and one or more terminals, where the digital payload satellite generates a physical spot beam that provides satellite network coverage to the terminals, the first GW configured with a first virtual beam to serve a first part of the spot beam's spectrum, the first part of the spot beam's spectrum corresponding to a first plurality of frequency carriers that are used by one or more of the terminals to communicate over the satellite network with the first GW; and a second GW communicatively coupled to the digital payload satellite and one or more of the terminals; the second GW configured with a second virtual beam to serve a second part of the spot beam's spectrum, the second part of the spot beam's spectrum corresponding to a second plurality of frequency carriers that are used by one or more of the terminals to communicate over the satellite network with the second GW.

In implementations, the terminals include a plurality of diverse terminals, where the plurality of diverse terminals are configured to communicate with the first GW using the first plurality of frequency carriers and to communicate with the second GW using the second plurality of frequency carriers.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1A:
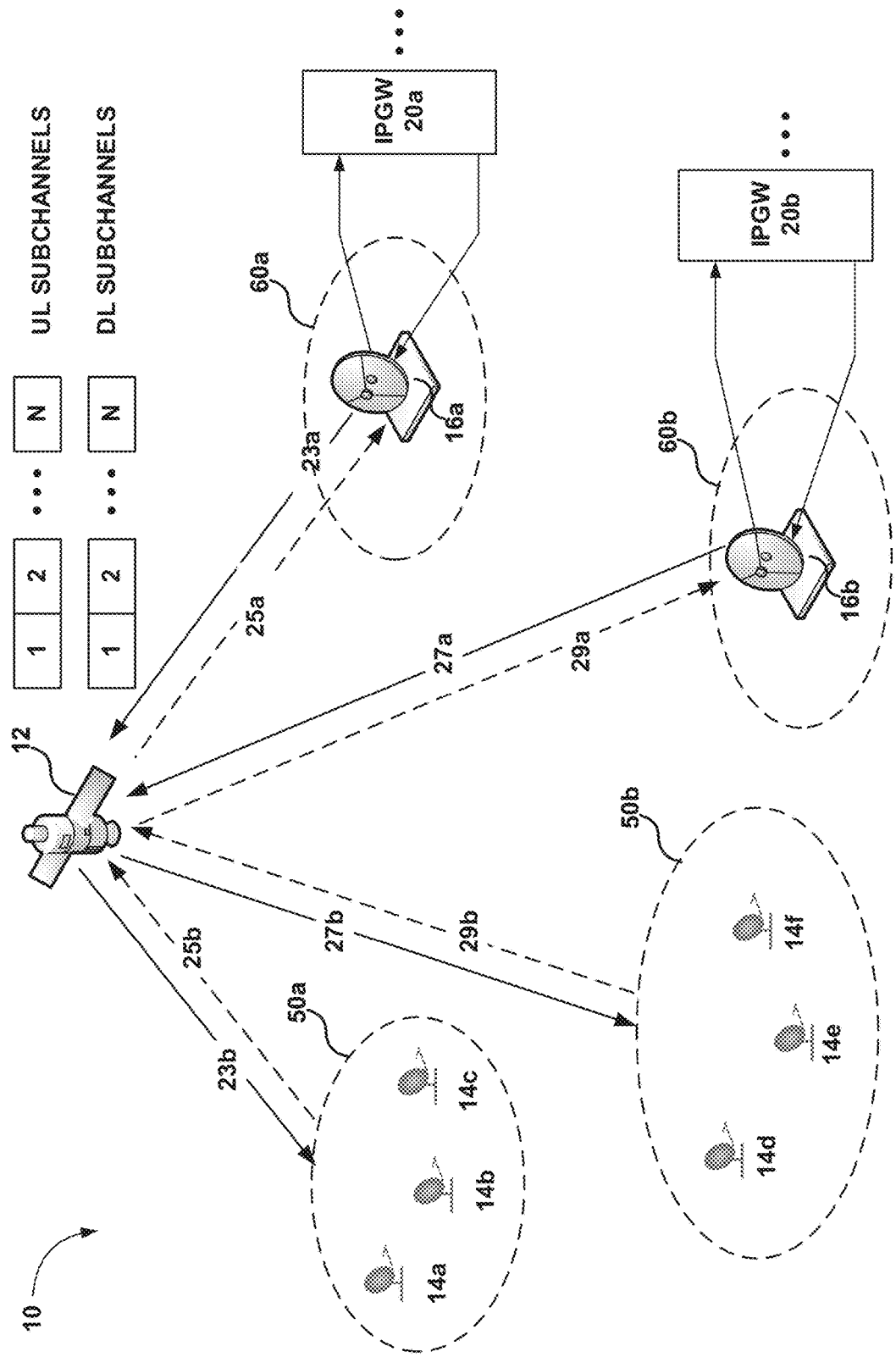
FIG. 1A illustrates an example digital payload satellite network in which the technology described herein may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As described above, in conventional bent pipe satellite systems, mappings between user spot beams and gateway spot beams are typically fixed due to the lack of on-board digital processing in the satellite. This makes it difficult and impractical to reconfigure user terminals operating on a given gateway earth station (GW) to operate with a new GW if in a different gateway beam. Depending on the type and/or configuration of the bent pipe satellite, in some cases it may not even be possible to redirect a user beam to a different GW beam. In cases where it is possible to redirect a user beam, the process may be cumbersome and require mechanical changes. By way of example, in bent pipe satellite systems a user spot beam (1) may be remapped from one gateway beam (A) to another gateway (B) as follows. Initially, the user beam 1 may be mapped to a gateway beam A by the satellite, (i.e., Gateway A is serving traffic in the user beam.) For this, Gateway A may support a set of forward and return carriers and may be connected to IP processing and controlled/configured from a network management system (NMS). A set of satellite terminals may be installed, commissioned and operating in the user beam 1. To begin remapping, all of the Gateway A carriers may be turned off by configuration from the NMS. Terminals would lose service at this point.

Thereafter, the user beam 1 configuration for Gateway A may be deleted from the NMS, updating Gateway A accordingly. Next the Gateway A association with the user beam 1 may be deleted from the NMS, updating Gateway A accordingly. This might also include user beam 1 service plan parameters, routing parameters, and other types of parameters which cannot remain configured if there is no user beam 1 for Gateway A.

Next, Gateway B association with the user beam 1 may be added from the NMS, updating Gateway B accordingly. This may also include user beam 1 service plan parameters, routing parameters, and other types of parameter which cannot be configured until there is a user beam 1 for Gateway B. Next, a user beam carrier configuration for Gateway B may be created from the NMS, updating Gateway B accordingly.

Next, the Gateway B carriers may be turned on by configuration from the NMS. Assuming all is well, the terminals could regain service at this point, but if there are problems the whole sequence may have to be reversed to restore service via the original Gateway A.

As the foregoing example illustrates, techniques for configuring user terminals to operate on new GWs in satellite communication systems are problematic. For example, remapping a user spot beam from one GW beam to another GW beam requires unconfiguring the spectrum from one beam before configuring it in the other beam, which may create extended outage time for the terminals in the user beam and increase the risk of mistakes.

A digital payload satellite systems provide various unique features that are not available in traditional analog satellite systems. The all-digital payload allows connectivity in discrete bandwidth increments from any beam to any beam. As such, uplinks and downlinks may be connected regardless of location within the physical beam footprint. Additionally, gateway beams do not have fixed connectivity to and from user beams. Via an on-board satellite digital switch, selected spectrum from any uplink beam may be connected to selected downlink spectrum to any downlink beam Implementations described herein are directed to leveraging these features of digital payload satellites to provide for the flexible assignment of user beams to gateway beams. In accordance with implementations described herein, a "virtual beam"—a set of data values associating a physical user satellite beam with a GW and used by the GW to service the physical user satellite beam, may be created or defined each time a physical user satellite beam is assigned to a GW (e.g., before user beam spectrum is mapped from one to GW to another GW or before user beam spectrum is mapped to a newly deployed GW). As such, for one physical user beam, a plurality of virtual beams may be created, where each virtual beam corresponds to a GW.

As further described below, each created virtual beam defines a plurality of beam parameters that may change when a new GW serves a physical user beam. For example, a virtual beam may specify changeable parameters such as, for example, a number and size (in frequency spectrum) of inroute and/or outroute channels, gateway beam and user beam spectrum assignments for inroute and outroute frequency channels, a bandwidth or subscription configuration of virtual network operators (VNOs), subscription service plans assigned to user terminals, IP addresses assigned to user terminals, and/or transmission power and timing correction values of user terminals.

The virtual beam parameters for a given GW may be setup on the GW independent of physical layer parameters of a physical user satellite beam that are not changeable across gateways such as polarization, frequency band, etc. As such, configuration of separate virtual beams on different GWs for the same physical user beam allows for pre-configuration of several beam attributes or parameters before all or a portion of a user beam is taken away from one GW and assigned to another GW. This may minimize any system outage and service interruptions when all or a portion of a physical spot beam is moved to a different GW. For example, readiness testing may be performed for a new GW while all or part of a spectrum of a user beam is still serviced by the original GW (e.g., not moved).

In accordance with implementations described herein, the virtual beams may be used in a variety of cases. For example, in the case of GW expansion, a digital payload satellite network may be configured such that a network does not use the entire available satellite spectrum from the very first day. Later, with the addition of more users to the network, additional satellite spectrum may be utilized, and virtual beams may be used to establish and deploy new GWs to serve the additional spectrum.

As another example case, in the case of physical user beam reassignment, a physical user beam that was served by one GW having one virtual beam configuration may be served by another GW having another virtual beam configuration. In one implementation of such cases, all user beam spectrum may be mapped from one gateway beam to another gateway beam. In another implementation of such cases, the connectivity of a user beam may be remapped in steps of spectrum from one gateway beam to another gateway beam. In such example cases, part of the user beam spectrum may be first moved to enable testing of the new gateway. Thereafter, blocks of spectrum (e.g., a forward/return carrier set) may be progressively moved (e.g., one at a time) until all are moved, in a sequence that may minimize configuration and performance risk.

As yet another example case, the connectivity of a user beam may be temporarily remapped in its entirety from one gateway beam to another gateway to facilitate gateway redundancy. For instance, a gateway may be configured as a backup gateway that provides site redundancy for a number of primary gateways in other gateway beams. In the event of a site catastrophe (e.g., antenna, power, flooding, fire, etc.), the user beams may be moved to the backup site until the primary site is again ready, and then could be moved back. Or the user beams could be distributed across multiple other primary or backup sites with capacity.

As yet a further example case, diversity operation of terminals may be achieved whereby a terminal may be served by multiple GWs having different virtual beams. For instance, different subscription plans for the same user terminal may be achieved using two different GWs having respective virtual beams specifying respective subscription plans. These and other example use cases in accordance with the disclosure are further described below.

FIG. 1A illustrates an example digital payload satellite network 10 in which the technology described herein may be implemented. It should be noted that although a single digital payload satellite 12 is illustrated in the example network of FIG. 1A, the technology disclosed herein may be implemented in digital payload satellite networks having any number of satellites, where each satellite may serve any number of GWs and user terminals.

Satellite network 10 in this example includes a digital payload satellite 12, remote terminals 14a-14f, and Gateway Earth Stations (GWs) 16a-16b. Feeder links may carry data between satellite gateways 16a-16b and satellite 12, and may include: forward uplinks 23a and 27a for transmitting data from GWs 16a-16b to satellite 12, and return downlinks 25a and 29a for transmitting data from satellite 12 to GWs 16a and 16b. User links may carry data between satellite 12 and remote terminals 14a-14f, and may include: return uplinks 25b and 29b for transmitting data from remote terminals 14a-14f to satellite 12; and forward downlinks 23b and 27b for transmitting data from satellite 12 to remote terminals 14a-14f. Forward uplinks 23a, 27a and forward downlinks 23b, 27b may form outroutes, and return uplinks 25b, 29b and return downlinks 25a, 29a may form multiple sets of inroutes.

GWs 16a-16b may be configured as high capacity earth stations with connectivity to ground telecommunications infrastructure. GWs 16a-16b may include radio frequency terminals (RFTs) (illustrated by FIG. 1A) that may send and receive signals to and from satellite 12, and may provide air interfaces for GWs 16a-16b. A network operations center (not shown) may be communicatively coupled to GWs 16a-16b over a network and direct their operation.

Also illustrated by FIG. 1A are IP Gateways (IPGW) 20a-20b that may include the set of layer 2 and layer 3 packet processing equipment between GWs 16a-16b and the Internet. In some implementations, IPGW 20a-20b may collocated with a GW 16a-16b. In other implementations, IPGWs 20a-20b may be provisioned at another location. In some implementations, multiple IPGWs may be connected to a single GW. The bandwidth of RFTs of the GWs may be shared amongst IPGWs, and at each IPGW, traffic flows may be classified into different priorities. These traffic flows may be processed and multiplexed before being forwarded to priority queues at the GW.

By way of example, IP traffic, including TCP and UDP traffic originating from a host from the internet, may enter a GW 16a-16b through an IPGW 20a-20b. The IPGW 20a-20b may include a TCP spoofer that acknowledges TCP traffic sent through the GW. The IP packets may then be transmitted to satellite 12 on forward uplinks 23a and 27a using the air interfaces provided by RFTs of GWs 16a and 16b. Satellites 12 may then transmit the IP packets to the user terminals 14a-14f using forward downlinks 23b and 27b. Similarly, IP packets may enter the network via the user terminals 14a-14f, be processed by the user terminals, and transmitted to satellite 12 on return uplinks 25b and 29b. Satellite 12 may then send these inroute IP packets to GWs 16a and 16b using return downlinks 25a and 29a.

Each of remote terminals 14a-14f can be, for example, very small aperture terminals (VSATs) and may connect to the Internet through satellite 12 and a GW and an IPGW. For example, remote terminal 14a may be used at a residence or place of business to provide a user with access to the Internet. VSATs or Mobile Satellite Terminals (MSTs), may be used by end users to access the satellite network, and may include a remote satellite dish for receiving RF signals from and transmitting RF signals to satellite 12, as well as a satellite modem and other equipment for managing the sending and receiving of data. They may also include one or more hosts, which may be computer systems or other electronic devices capable of network communications at a site. Terminals 14a-14f may each include a TCP spoofer, which may locally acknowledge TCP traffic sent by a host.

Satellite 12 may be any suitable digital payload communications satellite capable of channelizing satellite network spectrum into a plurality of N sub channels (uplink or downlink) and switching channelized uplink spectrum to downlink spectrum. For example, satellite 12 may utilize digital channelizers to digitize incoming RF signals.

Satellite 12 may operate in the Ka-band, Ku-band, C-band or other suitable band. Signals passing through the satellite may be based, for example, on the DVB-S2 standard (ETSI EN 302 307) using signal constellations up to and including at least 32-APSK, or on the Internet Protocol over Satellite (IPoS) standard (ETSI TS 102 354), or on other standard or proprietary specifications. Other suitable signal types may also be used, including, for example higher data rate variations of DVB-S2, or DVB-S2 extensions or adaptations sometimes designated as DVB-S2X.

Figure 1B:
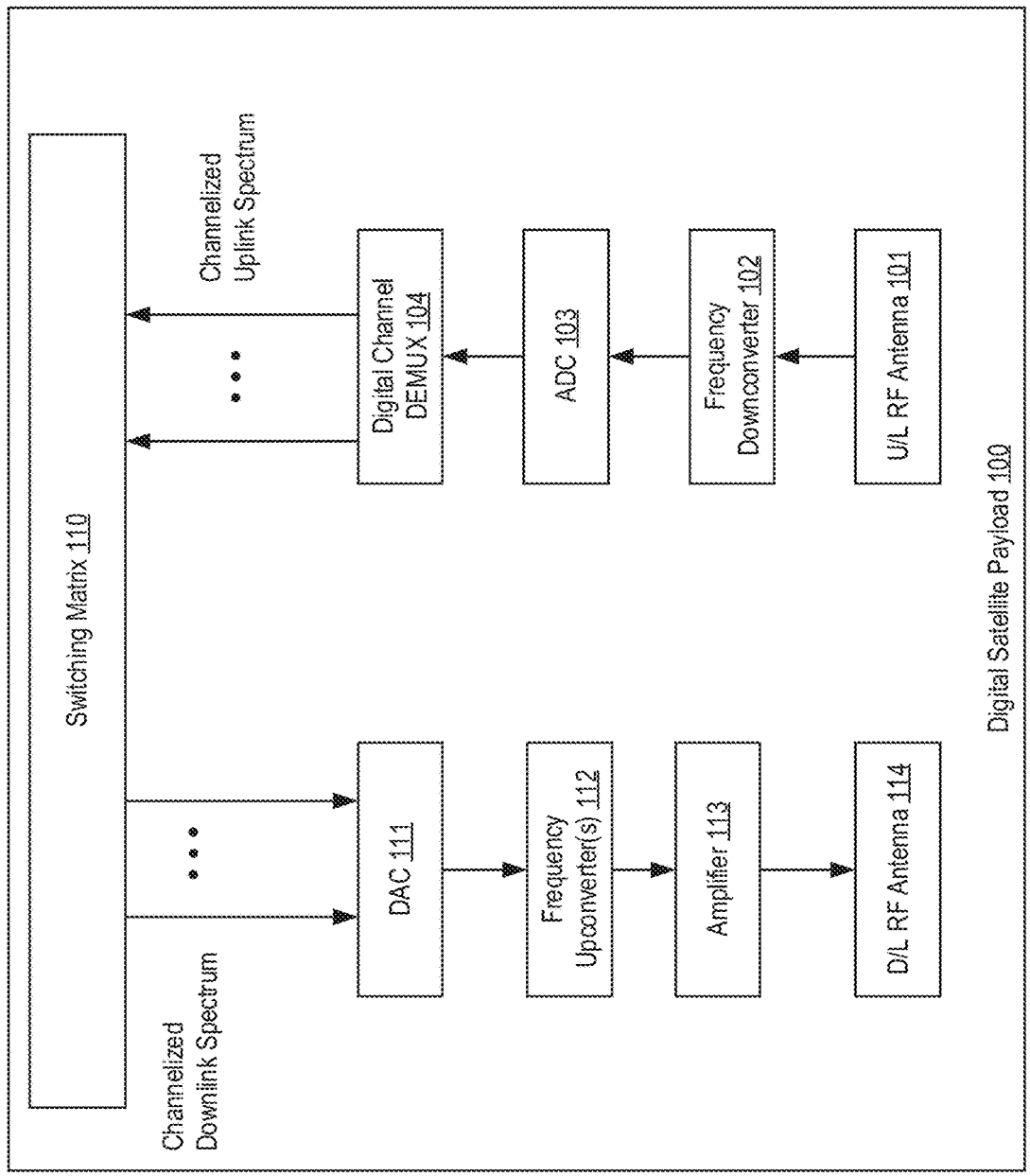
FIG. 1B illustrates an example payload for a digital payload satellite in accordance with an example implementation.

By way of example, FIG. 1B illustrates an example payload 100 for a digital payload satellite 12 in accordance with an example implementation. FIG. 1B illustrates certain functional blocks that are relevant to the disclosed technology, but it should be noted that a given satellite payload may include many other functional blocks, and the realization of the illustrated functions by specific hardware modules is not implied in this diagram. It should also be noted that one of ordinary skill in the art will understand that one or more of the components of digital satellite payload 100 may be implemented in digital form (e.g., as software running on a DSP or other processing device, with the addition of a DAC). In addition, certain components may be implemented in analog form (e.g., RF antenna).

Payload 100 may enable a) a given segment of uplink spectrum from a user beam to be mapped to a chosen segment of downlink spectrum of a gateway beam, and b) a given segment of uplink spectrum from a gateway beam to be mapped to a chosen segment of downlink spectrum of a user beam. This may enable the servicing of a user beam to be moved from one gateway beam to another gateway beam if the need arises. This may be done in whole, or in part (i.e., part of the user beam spectrum is remapped to a second gateway beam while part remains mapped to the first gateway beam).

On the uplink/receiver side, payload 100 may comprise an uplink (U/L) RF antenna 101 for receiving an uplink waveform, a downconverter 102 to convert incoming spectrum to an intermediate frequency, an analog-to-digital converter (ADC) 103, and a digital multi-channel demultiplexer (DE-MUX) 104.

A digital switching matrix 110 may provide IF switching to route channelized uplink and/or downlink spectrum.

On the downlink/transmitter side, payload 100 may comprise a digital-to-analog converter 111, upconverter(s) 112, power amplifier(s) 113, and downlink (D/L) RF antenna(s) 114. Individual or contiguous spectrum blocks of sub-channels may be combined to accommodate transmission of services larger than an individual sub-channel. The usable bandwidth of each beam may be determined by the number of sub-channels which have been allocated on the digital payload.

Referring again to FIG. 1A, satellite 12 may transmit satellite signals corresponding to user spot beams 50a and 50b, where the user spot beams 50a-50b have a coverage area that may be in the geographic region in which terminals 14a-14f are located and are able to connect to satellite 12. If terminals 14a-14f are within the coverage area of a user spot beam, they are said to be within the user spot beam. Otherwise, they are said to outside the user spot beam. Similarly, satellite 12 may provide coverage to gateways 16a-16b via respective gateways spots beams 60a-60b.

In the example environment of FIG. 1A, beam to beam connectivity between a user spot beam 50a-50b and a gateway spot beam 60a-60b may be established in multiple sub-channels within the bandwidth of satellite 12. This connectivity may be utilized in accordance with the disclosure by the creation of virtual beams that are created or defined when a user spot beam 50a or 50b is assigned to a GW 16a-16b.

Figure 2:
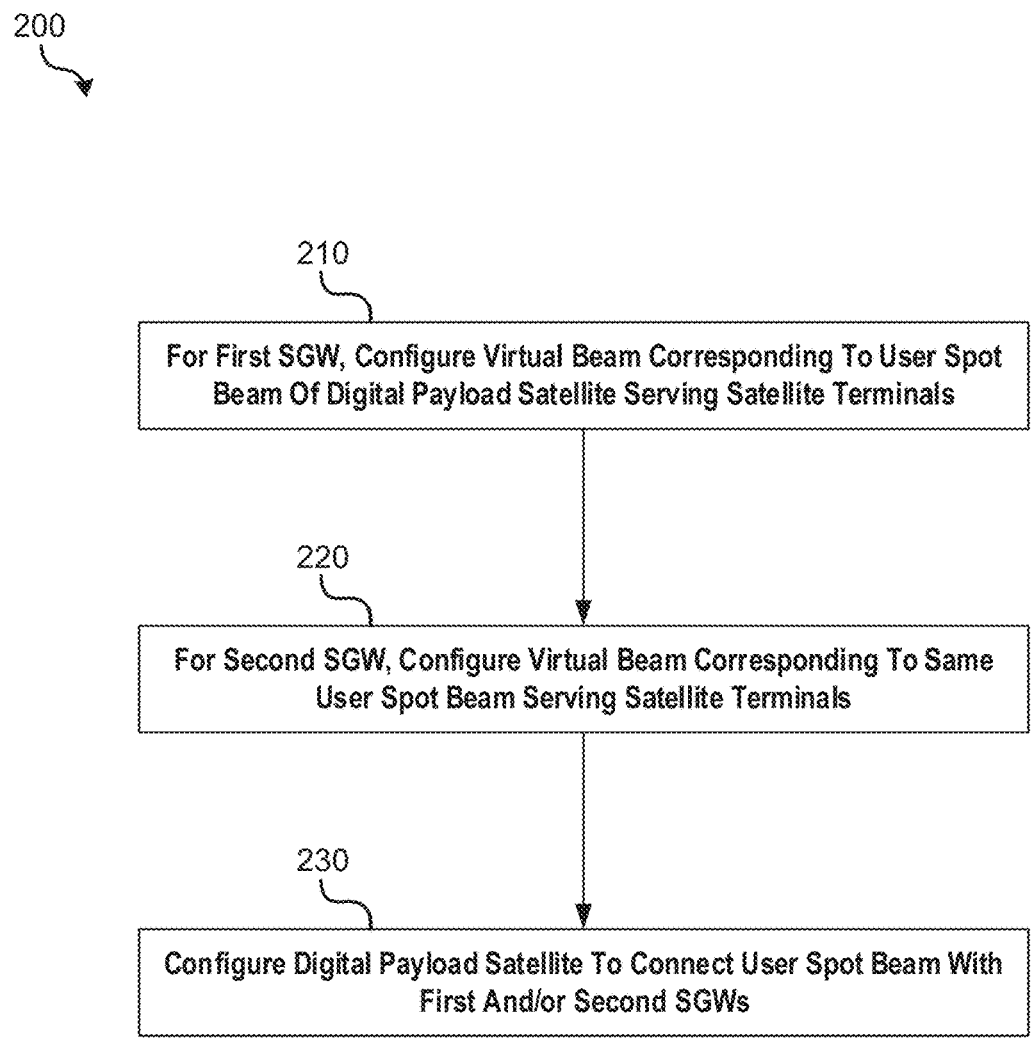
FIG. 2 is an operational flow diagram illustrating an example method of using Gateway Earth Station (GW) virtual beams to establish connectivity between Gateway Earth Stations and a user spot beam in accordance with the disclosure.

FIG. 2 is an operational flow diagram illustrating an example method 200 of using GW virtual beams to establish connectivity between GWs and a user spot beam in accordance with the disclosure. At operation 210, a first virtual beam is configured for a first GW where the first virtual beam corresponds to a user spot beam of a digital payload satellite serving one or more satellite terminals. In accordance with the disclosure, the configured first virtual beam defines a plurality of beam parameters that may be uniquely associated with the first GW serving the first user spot beam. These parameters are independent of physical layer parameters of the user spot beam that may not change from one GW to another GW such as the user spot beam's polarization and frequency band.

As noted above, a virtual beam is a set of data values associating a physical user satellite beam with a GW and used by the GW to service the physical user satellite beam. During operation, each created virtual beam may be transparent to terminals resident in the user satellite beam associated with the virtual beam. The virtual beam may represent a set of data values configured in a NMS database and propagated to, stored at, and/or used by the GW. These data values are associated to the virtual beam, and may ultimately apply to the physical user beam by way of the virtual beam being mapped to the user beam. In sequence, the virtual beam may be configured at the NMS for a GW, equipment of that GW (such as modulators, demodulators, routing paths, etc.) may be configured to that virtual beam via the NMS, virtual beam parameters may be loaded into the GW equipment, and the virtual beam may be associated with various configured operating parameters for the intended terminal population such as service plans, addressing, etc., as necessary.

By way of example, a virtual beam may specify parameters such as, for example, a number and size (in frequency spectrum) of inroute and/or outroute channels, gateway beam and user beam spectrum assignments for inroute and outroute frequency channels, a bandwidth or subscription configuration of virtual network operators (VNOs), subscription service plans assigned to user terminals, IP addresses assigned to user terminals, and/or transmission power and timing correction values of user terminals. By way of specific example, the first virtual beam may specify spectrum coverage for a 200 MHz outroute, a 300 MHz outroute, and four 50 MHz inroute having different frequencies. The first virtual beam may also specify that a VNO providing services through the user spot beam has a bandwidth subscription of 300 Mbps/75 Mbps on the outroute/inroute. The first virtual beam may further specify subscription data plans (e.g., a 30 Mbps/5 Mbps plan) provided to one or more terminals within the user spot beam, including, for example Maximum (PIR—Peak Information Rate), Guaranteed (CIR—Committed Information Rate) or CIR and PIR. Further still, IPv4 subnet pools and/or IPv6 prefixes of terminals may be configured for the first virtual beam. Moreover, timing and power correction offsets between two GWs that may be required of the terminals when a served user spot beam is moved from one GW to another GW may be specified.

At operation 220, a second virtual beam is configured for a second GW where the second virtual beam corresponds to the same user spot beam. The second virtual beam may specify beam parameter settings for the second GW such as, for example, a number and of inroute and/or outroute channels, gateway beam and user beam spectrum assignments for inroute and outroute frequency channels, a bandwidth or subscription configuration of VNOs, subscription service plans assigned to user terminals, IP addresses assigned to user terminals, and/or transmission power and timing correction values of user terminals. By way of specific example, the second virtual beam may be associated with a second subscription data plan having different upload/download speeds than the first subscription data plan specified by the first virtual beam. As such, in this specific example, two GWs may be configured to provide the same set of the terminals within a user spot beam different subscription data plans. Alternatively, in other implementations, the same subscription plans may be configured for two virtual beams.

Although implementations described herein have been so far described in the context of specifying new virtual beam parameter settings for each GW, it should be noted that in some implementations, some of the virtual beam parameter settings may be the same for different GWs. For example, in some cases it may be desirable to allow terminals to keep the same static IP addresses after a move from one GW to another GW. In such cases, both GWs may maintain a set of IPv4 subnets that have the same configuration in both GWs.

At operation 230, the digital payload satellite is configured to connect the user spot beam with the first and/or second GWs with the configured virtual beams. For example, in a gateway expansion process (i.e., where a new GW is added to the satellite network), operation 230 may include reconfiguring the digital payload satellite to redirect all communications with the physical user spot beam from the first GW to the second GW. It may also include allocating additional spectrum to the user spot beam because of the expanded capabilities in the network due to the addition of the new GW. As another example, to establish beam/gateway diversity whereby two GWs simultaneously serve a user spot beam, a portion of the user spot beam spectrum may be allocated to each GW. Alternatively, one of the two GWs may act as a backup, such that when one GW is down, terminals may move to the other GW (i.e., the user spot beam spectrum is allocated to the backup GW). These and other example use cases are further described below.

Gateway Expansion

The flexible connectivity in a digital payload satellite allows for a network to cover an entire region without using the satellite's entire spectrum from the very first day. Later, as the satellite uses additional spectrum (e.g., to serve new user terminals or provide improved bandwidth to existing terminals), virtual beams may be used to establish and deploy new GWs in the network as the original GWs may no longer have the capacity to serve the added spectrum. For example, FIGS. 3-4 illustrate an exemplary configuration of a digital payload satellite network 400 before (FIG. 3) and after (FIG. 4) adding a GW 423 to serve additional satellite spectrum assigned to an existing spot beam 430.

Figure 3:
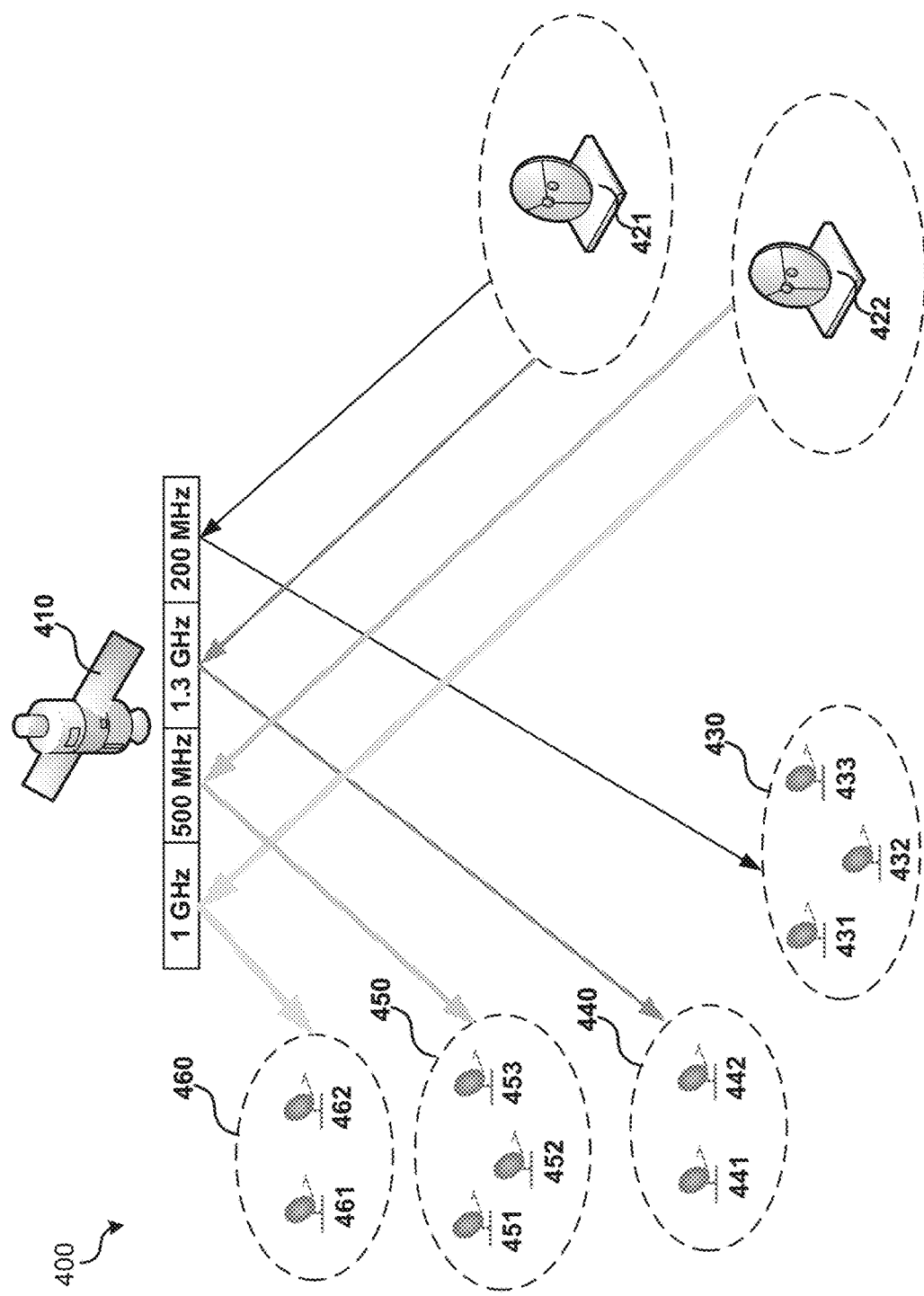
FIG. 3 illustrates an exemplary initial configuration of a digital payload satellite network.

As illustrated by FIG. 3, the satellite network 400 initially includes a digital payload satellite 410 providing service to terminals 431-433 via user spot beam 430, terminals 441-442 via user spot beam 440, terminals 451-453 via user spot beam 450, and terminals 461-462 via user spot beam 460. In this initial configuration, 1 GHz of spectrum is allocated to user spot beam 460, 500 MHz of spectrum is allocated to user spot beam 450, 1.3 GHz of spectrum is allocated to user spot beam 440, and 200 MHz is allocated to user spot beam 430. Additionally, GW 422 is assigned to the terminals in user spot beams 450 and 460, and GW 421 is assigned to the terminals in user spot beams 430 and 440. As such, the initial network configuration allocates 3 GHz of spectrum with four user spot beams, where all four beams may be illuminated and covering a wide geographic area.

The satellite 410 in the example of FIG. 3 is capable of allocating 4 GHz of spectrum, but the two initial GWs 421-422 do not have the capacity to be configured with 4 GHz spectrum (e.g., each GW may have a capacity of 1.5 GHz). Additionally, there may not be enough customers to require use of the 4 GHz spectrum from the satellite. Therefore, not all beams are configured with full spectrum—1 GHz Satellite space spectrum is unused during this initial configuration. However, after a few months of initial deployment of the digital payload satellite network, an increased number of users or increased demand of higher bandwidth per user may require additional spectrum to be allocated that is not capable of being served by the two GWs 421-422. For example, increased demand may require additional sub-channels of spectrum to be activated on user beam 430, which initially only has 200 MHz of allocated spectrum. In this example scenario, a new GW needs to be deployed to handle the load from the beam for which capacity is increased (in this case, beam 430).

Figure 4:
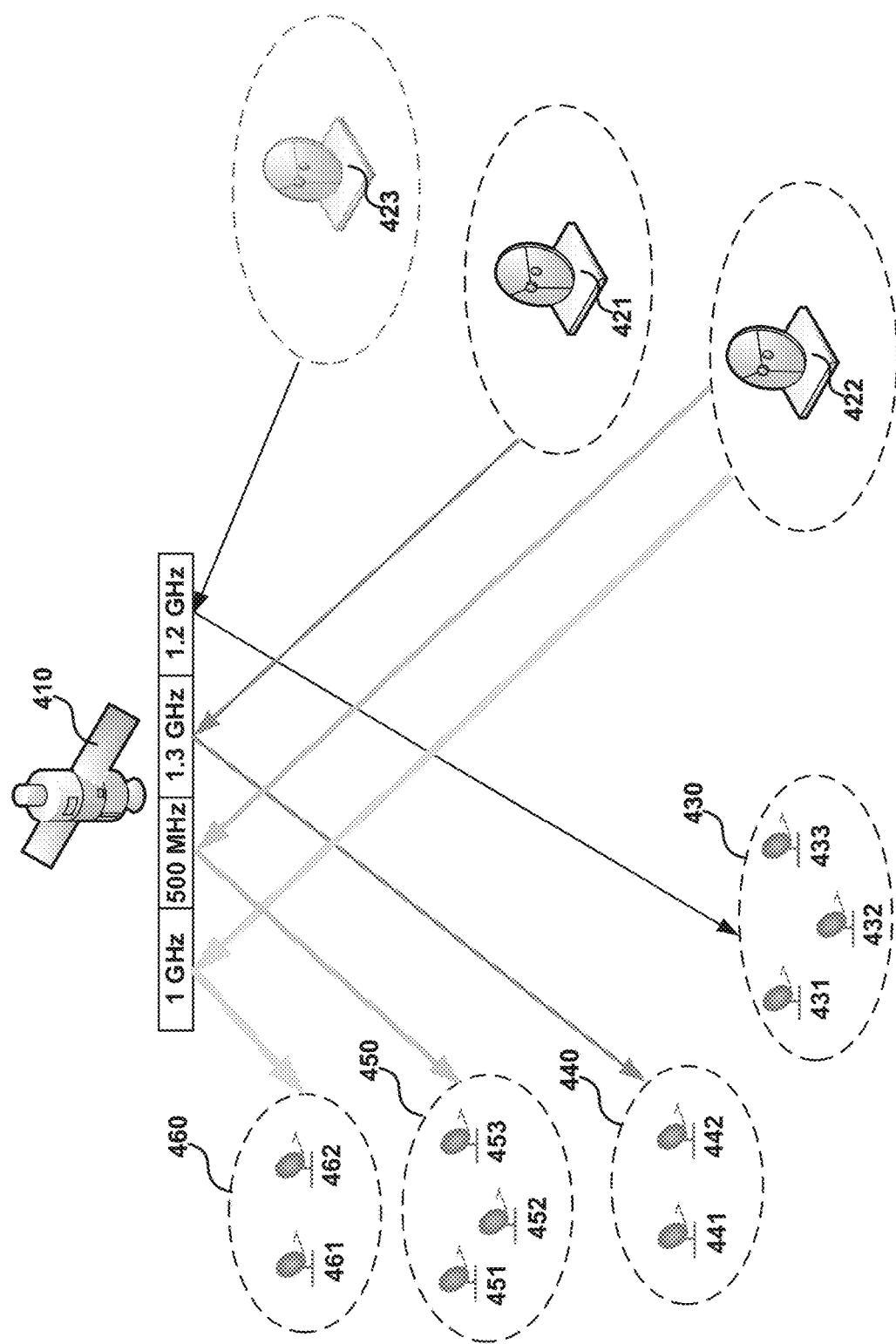
FIG. 4 illustrates an exemplary configuration of the digital payload satellite network of FIG. 3 after adding a new GW to serve additional satellite spectrum assigned to an existing spot beam.

As illustrated by the example of FIG. 4, the digital payload satellite 410 is reconfigured to utilize the remaining 1 GHz of spectrum to increase the capacity of beam 430 to 1.2 GHz of spectrum. As the two original GWs 421-422 cannot accommodate this increased spectrum, a third GW 423 is added and beam 430 is moved to GW 423. GW 421 was originally serving beams 430 and 440. After increasing the capacity of beam 430 to 1.2 GHz, GW 421 can no longer support both user beams 430 and 440, and GW 423 is deployed.

Figure 5:
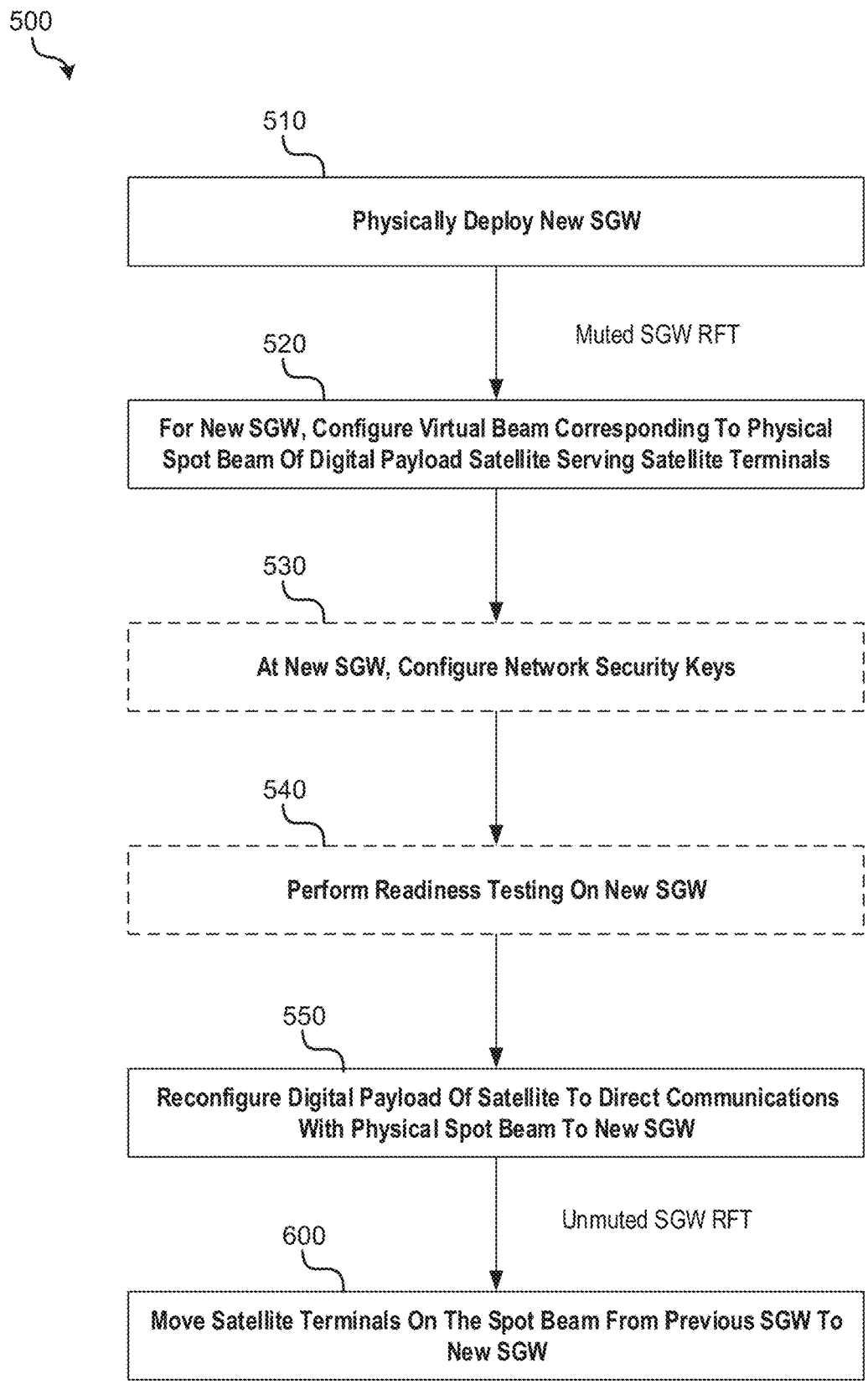
FIG. 5 is an operational flow diagram illustrating an example method of deploying a new GW in a digital payload satellite network to serve an existing user spot beam in accordance with implementations.

FIG. 5 is an operational flow diagram illustrating an example method 500 of deploying a new GW in a digital payload satellite network to serve an existing user spot beam in accordance with implementations. For example, method 500 may be implemented to move user beam 430 from original GW 421 to new GW 423.

At operation 510, the new GW (e.g., GW 423 in the example of FIGS. 3-4) is physically deployed. Physical deployment of the GW may include staging and configuration of the gateway's baseband components and RFT. Initially, the RFT of the GW may be muted such that it does not transmit signals to or receive signals a satellite. In alternative implementations, the RFT is not muted (e.g., if the GW serves another beam), but the GW modulator is muted.

At operation 520, a virtual beam is configured for the new GW, where the virtual beam corresponds to a physical user spot beam of a digital payload satellite that serves one or more terminals. As discussed above, a new virtual beam may be configured each time a physical user satellite beam is assigned to a new GW. By way example, consider the virtual beam configurations for GWs 421 and 423 for physical spot beam 430 in the example of FIGS. 3-4. In the initial configuration of the particular example of FIG. 3, GW 421 may be configured with a virtual beam corresponding to physical beam 430 (initially allocated 200 MHz) with the following parameters, summarized by Table 1, below:

TABLE 1

| GW 421 Virtual Beam Config. Corresponding to Physical Beam 430 (FIG. 3) ||
|---|---|
| Virtual Beam Parameter | Configuration |
| Number and size of inroute and outroute channels | One 150 MHz outroute and a pool of inroutes (different frequencies) totaling 50 MHz (sum of outroute and inroutes totals 200 MHz). |
| VNO subscription | VNO A and VNO B are providing services through this beam. Bandwidth subscription of VNO A and VNO B from this beam are configured as 200 Mbps/50 Mbps (outroute/inroute) and 150 Mbps/30 Mbps, respectively. |
| User terminal subscription plans | End users/terminals have different types of service plans— Best Effort (PIR), Guaranteed (CIR) or CIR with PIR. In terms of throughput, some terminals are subscribed 20 Mbps/ 5 Mbps, others to 10 Mbps/2 Mbps, etc. |
| User terminal IP addresses (IPv4 subnet pools and/or IPv6 prefixes) | —172.16.5.0/24, 172.16.6.0/24, 172.16.7.0/24 configured on this virtual beam from where terminals were assigned/ 29 IPv4 subnets. |
| Transmission power and timing correction offset values | Delta power and timing offsets set to zero (0). |

When GW 423 is added to the network, GW 423 may be configured with its own virtual beam (independent of the virtual beam of GW 421) corresponding to spot beam 430. For example, after the staging and installation of all components of GW 423 are completed during physical deployment (operation 510), in the expanded configuration of the particular example of FIG. 4, GW 423 may be configured with a virtual beam corresponding to physical beam 430 (now allocated 1.2 GHz) with the following parameters, summarized by Table 2, below:

TABLE 2

GW 423 Virtual Beam Config. Corresponding to Physical Beam 430 (FIG. 4)

| Virtual Beam Parameter | Configuration |
| --- | --- |
| Number and size of inroute and outroute channels | Three 250 MHz outroutes and a pool of inroutes totaling 450 MHz (sum of outroutes and inroutes totals 1.2 GHz). |
| VNO subscription | Bandwidth subscription of VNO A and VNO B configured as 1 Gbps/300 Mbps (outroute/inroute) and 800 Mbps/200 Mbps, respectively. |
| User terminal subscription plans | End users/terminals have different types of service plans - Best Effort (PIR), Guaranteed (CIR) or CIR with PIR. In terms of throughput, some terminals are subscribed 20 Mbps/5 Mbps, others to 10 Mbps/2 Mbps, etc. |
| User terminal IP addresses (IPv4 subnet pools and/or IPv6 prefixes) | 172.16.5.0/24, 172.16.6.0/24, 172.16.7.0/24, 172.16.8.0/24, 172.16.9.0/24, 172.16.10.0/24, 172.16.11.0/24 are configured from where terminals will be assigned/29 IPv4 subnets. |
| Transmission power and timing correction offset values | Delta power and timing offsets between GW 423 and GW 421 set to non-zero values. |

As illustrated in the example virtual beam configuration of Table 2, the carrier configuration of GW 423 is different from GW 421 as the spectrum of the satellite 410 has been expanded. Additionally, the bandwidth of VNO A and VNO B is expanded to accommodate the additional capacity of physical beam 430. Further still, additional subnet pools are added in addition to those configured for the virtual beam for GW 421 in order serve more customers (e.g., install more terminals). When a dynamic IP address plan is used, the new GW 423 may have its own IPv6 prefix or IPv4 subnet pools which are different from that being used in GW 421 (further discussed below). Additionally, delta power and timing offsets are set to non-zero values for the GW 423 to account for power and timing differences between GW 421 and GW 423. This may be a static configuration where the delta values are predetermined. Alternatively, a dynamic method (further described below) may be employed to determine these values.

In the example virtual beam configuration of Table 2, GW 423 maintains the same types of service plans (based on subscribed rates) for terminals, but service plans may be specified for additional terminals (e.g., as part of network expansion). In other implementations, such as ones where no new terminals are added, subscribed rates may be increased for the existing terminals. Alternatively both number of terminals and subscribed rates may be increased in response to spectrum expansion, and this may be reflected in the configured virtual beam.

In example method 500, because the user spot beam is still being served by the original GW using the older capacity of the beam (e.g. GW 421 in the example of FIGS. 3-4), configuration of the new GW (e.g., GW 423) need not affect the original GW due to the independent configuration of virtual beams on each of the two GWs.

At optional operation 530, network security keys may be configured at the new GW for satellite terminals corresponding to the physical spot beam. In implementations, a central network management system (e.g., as part of a network operations control center) may ensure that the same root key and key version number as configured at the original GW are configured at the new GW.

From the root key and key version number, individual terminal session keys may be derived for data sessions to encrypt traffic specific to a terminal. The gateway components of the new GW may generate the data session keys from the media access control (MAC) address of the terminals and the root key and key version number. Because the respective MAC addresses of the terminals do not change over time, and a gateway identifier need not be used to generate terminal keys, the terminals may continue to use the same keys that were used with the prior GW.

At optional operation 540, readiness testing may be performed on the GW. When a new GW is installed to support GW expansion, a series of readiness tests may be performed to test the GW's frequencies and component chains and communication paths in order to have a high confidence that the new GW will operate when its RFT is switched on after the reconfiguration of the digital payload of the satellite. One or more test indoor units (IDU) or terminals may be used to determine that the GW equipment is working and ready to take over one or more spot beams from one or more existing GWs.

As the RFT may be muted during testing, the new GW may utilize a transmission level redirection and loopback of communication. The transmission at the GW may be redirected to a set of test terminals located at the new GW. The redirection to a testing mode may be remotely controllable such that the redirection is disabled when the digital satellite payload is reconfigured.

During testing, each outroute component of the new GW may be associated with a code rate organizer (CRO) application, which may be a software component or module running inside the baseband GW. As the GW's test components are not transmitting over the satellite during testing, the frequencies used by the test CROs can utilize L-band frequency ranges normally excluded in operational use. For example, gaps between the operational frequency bands or beyond the edges of the operational frequency bands may be utilized.

During testing, each inroute component of the new GW may be associated with a set of test Inroute Groups. Because these test Inroute Groups are not transmitted over the satellite but instead injected by test terminals connected to the RFT, the frequencies used by the test Inroute Group channels may utilize frequency ranges normally excluded in operational use such as guard bands at the edge of frequency bands. The test terminals may inject their inroute traffic directly into the inroute stream and behave like a normal terminal, listening for a signal on an outroute like a normal terminal, but without the time delay associated with satellite transmission. The test terminals may compensate for this lack of satellite delay when transmitting.

A gateway test manager may be used to control and perform readiness testing. The gateway test manager may be configured and managed from a network management system (NMS), which may be central or collocated depending on the deployment scenario. During testing, the gateway test manager may transmit alarms and overall GW testing status to the NMS. In implementations, the NMS may be able to poll the test terminals using a simple network management protocol (SNMP).

In implementations, the interface between the test terminals and the gateway test manager may be a web-based interface whereby an HTTP request method (e.g., HTTP Get) may be used to invoke test commands. In this implementation, responses may be in XML format. The gateway test manager may command each test terminal to use an applicable configuration for the test terminal out of a set of possible configurations. Each of the test terminals may inject test traffic and signals while monitoring the results. Each test terminal may report its monitored test traffic results to the gateway test manager. The readiness test results may be collected and provided as reports for operational review of the new GW and for determining if it is ready to take beams from the other GW.

Although readiness testing has so far been described on the context of using a transmission loopback and test terminals within the GW, in other implementations, test terminals deployed in the physical user beam may be used to perform readiness testing. For example, a flexible payload may allow a small segment of the intended user beam spectrum to be connected to the new GW for an end-to-end test using test terminals deployed in the physical user beam, while the production terminal population may continue to use the other GW.

At operation 550, the digital payload of the satellite may be configured to redirect communications with the physical spot beam to the new GW. For example, once readiness tests are passed on the new GW with a high degree of confidence, digital payload reconfiguration may be performed at the satellite. For instance, in the example of FIG. 4, satellite 410 redirects communications with beam 430 to the new location of GW 423. Additionally, satellite 410 expands the spectrum associated with the spot beam from 200 MHz to 1.2 GHz. Once the reconfiguration is done, GW 421 ceases to serve beam 430, which is now served by GW 423. The physical coverage of beam 430 may remain the same after the transfer.

After the digital payload configuration is completed, the RFT of the new GW may be unmuted. Additionally, the test inroute components of the new GW may switch to other operational inroute groups when the new GW starts operation after the reconfigured spectrum of digital payload is turned ON and the RFT is turned on. Further, the outroute components of the GW may switch to operational when the new GW starts operation after the reconfigured spectrum of digital payload is turned ON and RFT is unmuted.

Additionally, the IPGW baseband component of the previous GW may stop advertising routes of terminals located in physical spot beam to the external network (e.g., Internet) such that the traffic from the Internet can be directed towards the new GW.

In some implementations, instead of remapping all of the user beam spectrum at once from the original GW to the new GW, the digital payload may remap only a portion of the user beam spectrum at a time. Some advantages may be achieved from such an implementation. For example, such an implementation permits testing of a new GW before going live with all user traffic. Additionally, such a configuration may be used to transition terminals in a gradual or incremental fashion from one GW to another.

Figure 6:
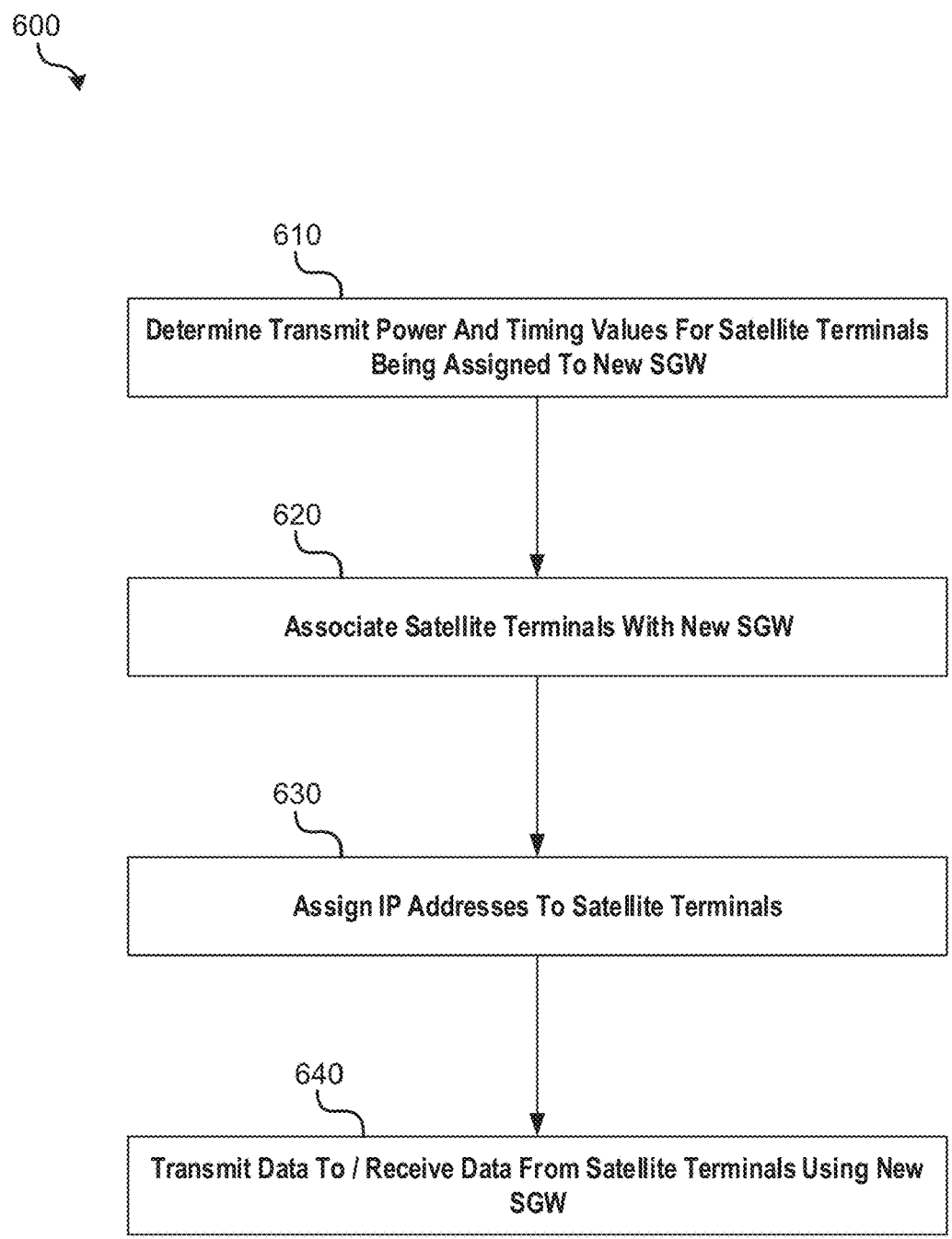
FIG. 6 is an operational flow diagram illustrating an example method of moving satellite terminals with a physical spot beam from a first GW to a second GW.

At method 600, the satellite terminals associated with the physical spot beam are moved to the new GW such that the new GW may transmit data to/receive data from the terminals. Example implementations of method 600 are further described below with reference to FIG. 6.

Although the example of method 500 is described in the context of deploying a new GW to serve one existing user spot beam, it should be appreciated from the foregoing description that method 500 could be implemented such that the new GW serves a plurality of existing user spot beams. For example, each of operations 520-600 could be performed for each physical user spot beam that is assigned to the new GW.

With reference now to method 600, a plurality of operations may need to be performed to complete the process of moving satellite terminals associated with the physical spot to the new GW. Assuming the new GW is located in a different geographic location than the previous GW, inroute signals transmitted from the terminals to the GW and outroute signals transmitted from the GW to the terminals may not experience the same signal power to interference-plus-noise-ratio, and the terminals may not be able to transmit and receive signals successfully using the same power margins established with the previous GW. Additionally, due to the new geographic location, the propagation delay of signals transmitted between the user terminals and serving GW (i.e., time signals take to travel from GW to satellite to terminal on an outroute and from terminal to satellite to GW on an inroute) will change. As such, at operation 610, signal power and timing values for satellite terminals being assigned to the new GW may be determined. In implementations, these values may be determined as offsets from the values of the prior GW or the first GW that served the user spot beam.

In one implementation, transmit power offset values and/or timing offset values may be precalculated and configured as part of virtual beam configuration of the new GW (operation 520). In this implementation, the new GW may broadcast the signal power offset values and timing offset values to the terminals.

Regarding the determination of signal power values, in implementations where the values may not be predetermined, the terminal transmit power may be dynamically determined by commanding a small subset of the terminals (e.g., no more than 10 terminals, or even fewer than 5 terminals) within the physical spot beam to engage in a terminal ranging process against the new GW to establish new ranging power references. This subset of selected terminals may be geographically distributed within the physical spot beam to provide a representative sample. The subset of terminals may be pre-scheduled to start the ranging procedure after receiving outroute information from the new GW. These terminals may transmit to the new GW any individual power attenuation differences with respect to the previous GW that are determined during ranging. The GW may average the power attenuation differences received from the preselected terminals and that averaged value may broadcast to all the terminals. For example, the GW may broadcast average power attenuation differences for each inroute channel that the terminals use to transmit to the GW. Each terminal may adjust its ranging power reference value by the power difference, lock to an outroute of the new GW, and begin a closed loop power control procedure before transmitting its first burst to the new GW.

In yet another implementation, the terminal transmit power may be determined by having all terminals within the user spot beam engage in a ranging procedure against the new GW to establish new ranging power references for all terminals. In the case of a large number of terminals, this procedure may be accelerated by configuring additional bootstrap ALOHA.

In implementations where the signal timing values may not be predetermined, a true time delay of signal transmission between the new GW and satellite may be determined when loopback facility is available on the GW's beam. When loopback facility is available, the GW can receive back its own transmission from the satellite (e.g., a small part of GW uplink spectrum may be mapped back into the downlink to the same GW), and a timing module of the GW can measure true GW to satellite propagation delay based on the time it takes the GW to receive back its own transmission. The new GW may measure the propagation delay once its RFT is unmuted. The measured propagation delay may then be broadcast to the terminals. As such, in this implementation, the terminals do not need to perform any ranging process to determine the time delay.

In another implementation, when loopback facility is not available, timing corrections may be calculated by ranging a small subset of the terminals with respect to the new GW. For example, this may be implemented while ranging a small subset of terminals to calculate power values as discussed above. When a few terminals are ranged, the GW may estimate the timing corrections from received terminal transmit signals by comparing them to the GW's own outroute transmitting timing to determine an offset. A timing module at the new GW may average the timing corrections calculated for each of the terminal transmit signals, and calculate a delta timing offset with respect to the previous GW. Thereafter, the new GW may broadcast this offset on an outroute to all terminals, and the terminals may adjust their timing values.

In yet another implementation, when loopback facility is not available, timing corrections may be calculated by having all terminals within the user spot beam engage in a ranging procedure against the new GW. This implementation may take longer than the aforementioned implementations.

At operation 620, the satellite terminals are associated with the new GW using an association protocol. For example, after obtaining optimal power and timing values, each terminal may be associated with the new GW using a proprietary association protocol. During association, each terminal may transmit a last known volume usage (e.g., amount of data used by a terminal over a period of time) to the new GW. A volume usage limit is a type of Fair Access Policy (FAP) where a terminal or user's throughput may be throttled upon exceeding volume usage above a configured limit. The terminal may transmit the latest FAP information to the new GW, and the new GW may begin counting volume usage from the latest FAP information. The FAP information may be signed by a service plan key to secure the FAP information to prevent unauthorized access.

At operation 630, IP addresses are assigned to the satellite terminals. When a physical spot beam and its terminals are moved to the new GW, user device IP addresses of terminals may need to be considered. These IP addresses may include both static and dynamic IP address plans for IPv4 and IPv6 of terminals. For the dynamic address plans, the new GW may have its own IPv6 network prefix and IPv4 subnets that are different from the previous GW. In this case, the terminal may obtain a new IP address.

In implementations, terminals may maintain the same static IP addresses after the move. As part of the GW configuration, a number of IPGWs may be pre-designated to support static IPv4 plans. These IPGWs may be configured with a set of IPv4 subnets which are the same as those configured from the previous GW. An IPGW may report the reachability to these subnets using a border gateway protocol (BGP) on its Internet interface upon switching GW. As mentioned above, IPGWs at the previous GW may be configured to stop advertising routes of terminals located in physical spot beam to the external network (e.g., Internet) such that the traffic from the Internet can be directed towards the new GW.

In implementations, the static address pool may be configured at a beam scope or system scope. When beam scope addressing is employed, by configuring virtual beams for the same physical spot beam, the same IP address pools may be configured on two different GWs. This allows for preconfiguration and setup of a virtual spot beam corresponding to a physical spot beam that is intended to be remapped to the new GW without disturbing the current operation of the physical spot beam through the previous GW virtual spot beam.

At operation 640, once the terminals have IP addresses, they may transmit data to and from the new GW.

Beam/GW Diversity

In some example use cases, multiple GWs may serve the same physical spot beam to achieve diversity between one physical beam and multiple GWs. For example, in some implementations, different parts of the spectrum of a user spot beam may be respectively served by each of a plurality of GWs at the same time. In some implementations, when one GW is down, terminals may be moved to another GW.

Figure 7:
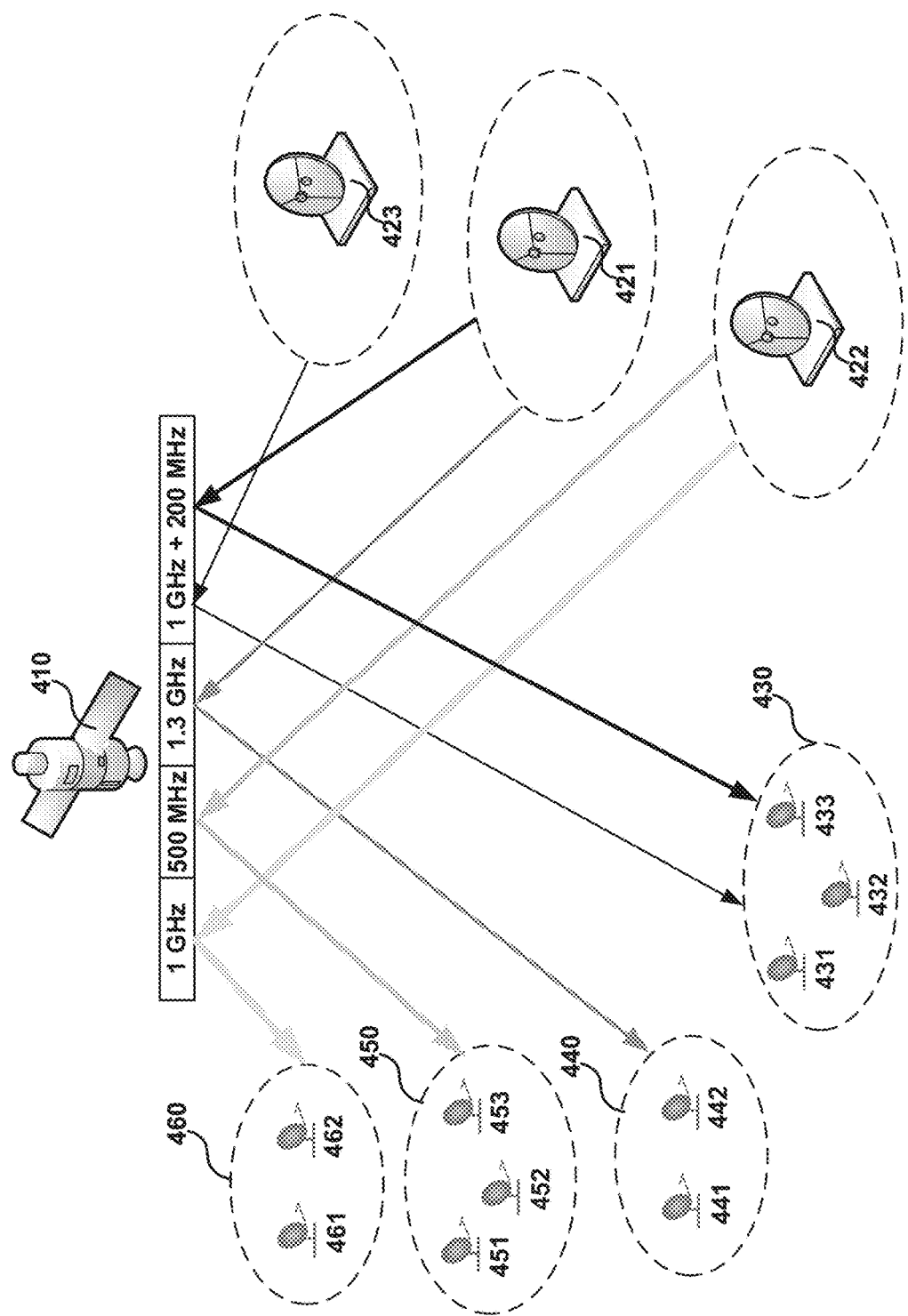
FIG. 7 illustrates an exemplary configuration of the digital payload satellite network of FIG. 3 after adding a new GW to simultaneously serve the same spot beam as an existing GW.

Referring again to the example of FIG. 3, instead of moving the entire user beam 430 to the new GW 423 (FIG. 4), beam 430 may instead be connected to two different GWs located at different geographical places (GW 421 and GW 423) by moving only part of the beam's spectrum. This example use case is illustrated by FIG. 7. Like the example of FIG. 4, the digital payload satellite 410 in this example is configured to utilize the newly added spectrum of 1 GHz to increase the capacity of beam 430 to 1.2 GHz of spectrum. In this alternative use case, the spectrum of beam 430 may be channelized such that GW 421 continues to serve the original 200 MHz of spectrum while the newly added 1 GHz of spectrum is served through the new GW 423.

Figure 8:
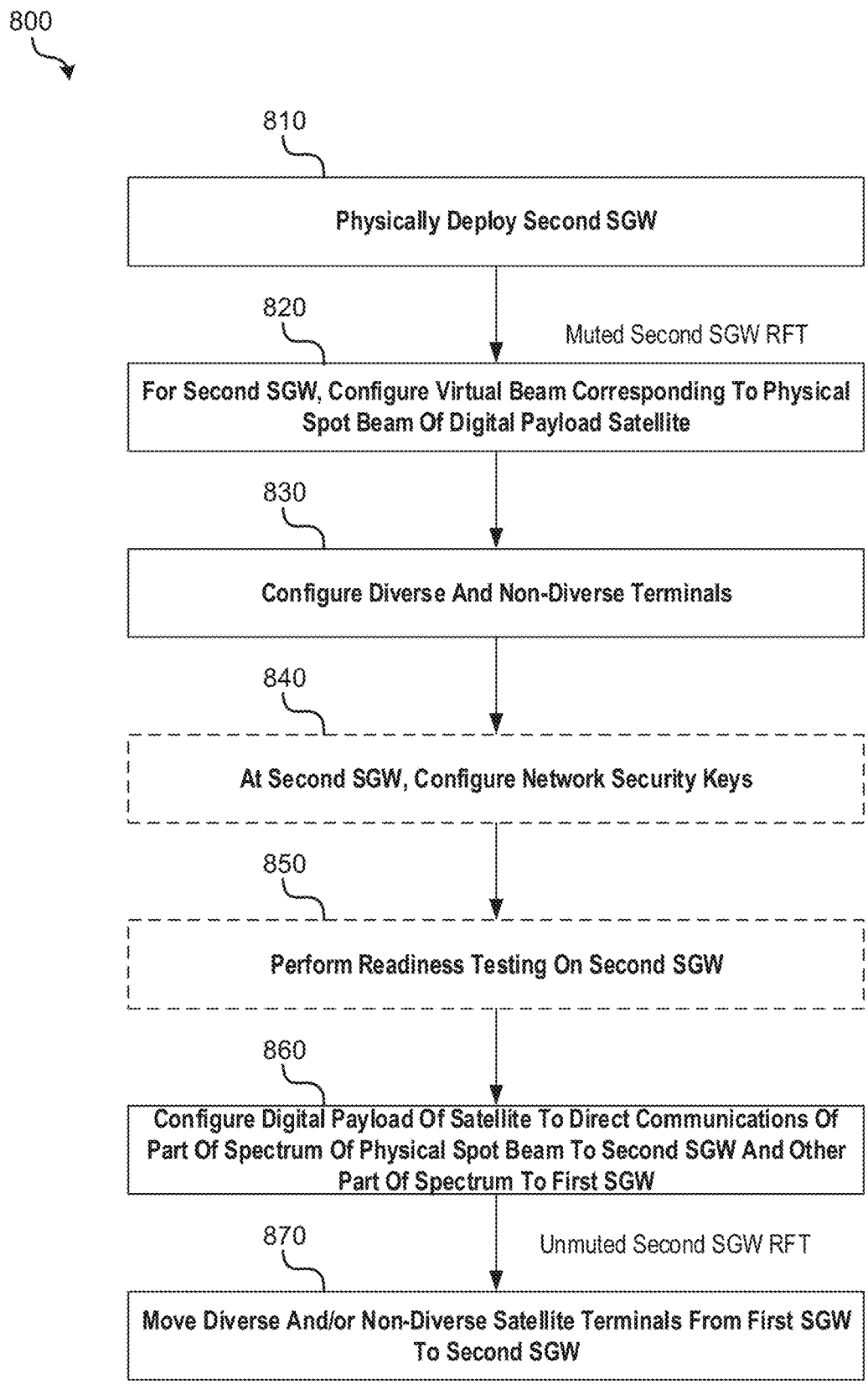
FIG. 8 is an operational flow diagram illustrating an example method of adding a second GW in a digital payload satellite network such that an existing user spot beam is served by both a first and second GW.

FIG. 8 is an operational flow diagram illustrating an example method 800 of adding a second GW in a digital payload satellite network such that an existing user spot beam is served by both a first and second GW. For example, method 800 may be implemented to achieve diversity between a spot beam 430 and GWs 421 and 423 as illustrated in FIG. 7.

At operation 810, the second GW (e.g., GW 423 in the example of FIGS. 3 and 7) is physically deployed. Physical deployment of the second GW may include staging and configuration of the gateway's baseband components and RFT. Initially, the RFT of the second GW may be muted such that it does not transmit signals to or receive signals the digital payload satellite.

At operation 820, a virtual beam is configured for the second GW, where the virtual beam corresponds to the physical user spot beam that is currently being served by the first GW. As configured, the virtual beam may correspond to a portion of the spectrum that is currently allocated to or will be allocated to the user spot beam by the digital payload satellite.

By way example, consider the virtual beam configurations for GWs 421 and 423 for physical spot beam 430 in the example of FIGS. 3 and 7. As discussed above, in the initial configuration of the particular example of FIG. 3, GW 421 may be configured with a virtual beam corresponding to physical beam 430 (initially allocated 200 MHz) with parameters summarized by Table 1, above.

When GW 423 is added to the network in the example of FIG. 7, GW 423 may be configured with its own virtual beam (independent of the virtual beam of GW 421) corresponding to a portion of the spectrum that will be utilized on spot beam 430. For example, after the staging and installation of all components of GW 423 are completed during physical deployment, in the diversity configuration of the particular example of FIG. 7 GW 423 may be configured with a virtual beam corresponding to physical beam 430 with the following parameters, summarized by Table 3, below:

TABLE 3

GW 423 Virtual Beam Config. Corresponding to Physical Beam 430 (FIG. 7)

| Virtual Beam Parameter | Configuration |
| --- | --- |
| Number and size of inroute and outroute channels | Two 250 MHz outroutes, one 200 MHz outroute, and a pool of inroutes totaling 300 MHz (sum of outroutes and inroutes totals 1.0 GHz). |
| VNO subscription | Bandwidth subscription of VNO A and VNO B configured as 600 Mbps/200 Mbps (outroute/inroute) and 400 Mbps/150 Mbps, respectively. |
| User terminal subscription plans | End users/terminals have different types of service plans - Best Effort (PIR), Guaranteed (CIR) or CIR with PIR. In terms of throughput, some terminals are subscribed 20 Mbps/5 Mbps, others to 10 Mbps/2 Mbps, etc. |
| User terminal IP addresses (IPv4 subnet pools and/or IPv6 prefixes) | 172.16.5.0/24, 172.16.6.0/24, 172.16.7.0/24, 172.16.8.0/24, 172.16.9.0/24, 172.16.10.0/24, 172.16.11.0/24 are configured from where terminals will be assigned/29 IPv4 subnets. |
| Transmission power and timing correction offset values | Delta power and timing offsets between GW 423 and GW 421 set to non-zero values. |

As illustrated in the example virtual beam configuration of Table 3, the carrier configuration of GW 423 is different from GW 421 as the spectrum of spot beam 430 served by each of these GWs in different. Additionally, the configuration of terminal subscription plans of diverse terminals that move between the two GWs may be kept the same or made different.

At operation 830, diverse and non-diverse terminals may be configured for the first and second GWs. A diverse terminal is a type of terminal that can communicate with both GWs but on different carriers. By way of example, diverse terminals may be configured with the outroute information from both gateways, one designated as a primary (e.g., "HOME") GW, and the other a secondary (e.g., "FOREIGN") GW. The diverse terminal may start its operation on the primary GW. It may need to move between GWs due to various reasons, such as a link with its primary GW not working or load balancing requiring it to be moved to the secondary GW.

A non-diverse terminal is a type of terminal which is fixed to one GW for its operation and service. This terminal is not moved between diverse GWs. For existing non-diverse terminals being served by the first GW, they may continue to be associated with the first GW or they may be moved to the second GW (e.g., because the second GW serves more spectrum).

At optional operation 840, network security keys may be configured at the second GW for the physical spot beam. For instance, a central NMS may ensure that the same root key and key versions numbers configured at the first GW are configured on the second GW. These keys may be configured as discussed above with reference to operation 530.

At optional operation 850, readiness testing may be performed on the second GW. Readiness testing may be performed similar to operation 540, discussed above.

At operation 860, the digital payload of the satellite may be configured to direct communication of a part of the spectrum of the physical spot beam to the second GW and the other part of the spectrum to the first GW. This may be done, for example, by reassigning target terminals to an outroute carrier transmitted by the second GW, from which those terminals will learn of inroute carriers and other parameters to be used to communicate with the GW.

For instance, in the example of FIG. 7, satellite 410 directs the 1 GHz of expanded spectrum corresponding to beam 430 to the location of GW 423. The 200 MHz of original spectrum also corresponding to beam 430 is still directed to the location of GW 423. The physical coverage of beam 430 may remain the same with the addition of the second GW. As another example, a portion of the 1 GHz of expanded spectrum may be directed to the location of the GW 421 with the remainder being directed to GW 423. As yet another example, a portion of the 200 MHz of original spectrum may be directed to the location of GW 423 along with the 1 GHz of expanded spectrum.

At operation 870, diverse and/or non-diverse satellite terminals of the first GW may be moved to the second GW. For example, the second GW may broadcast to terminals, on an outroute, pre-calculated and pre-configured delta power attenuation and timing offset values with respect to the first GW. These values may be used to transmit through the second GW by non-diverse terminals that are moved to the second GW and diverse terminals that configure the second GW as the primary GW.

During terminal movement, diverse terminals may keep the same IP address between the first GW and the second GW. Non-diverse terminals that are moved to the second GW may be assigned a new IP address if a dynamic IP plan is used. If a static plan is used, these terminals may keep the same IP address.

In the diversity case, the diverse terminals of the digital payload satellite network may communicate with the first or second GWs depending on network conditions. For example, when one GW is down or out of service, all diverse terminals previously communicating with the GW may be moved to the other GW. This movement may also occurs in case a link to a GW is bad or load balancing requires movement of some terminals.

Figure 9:
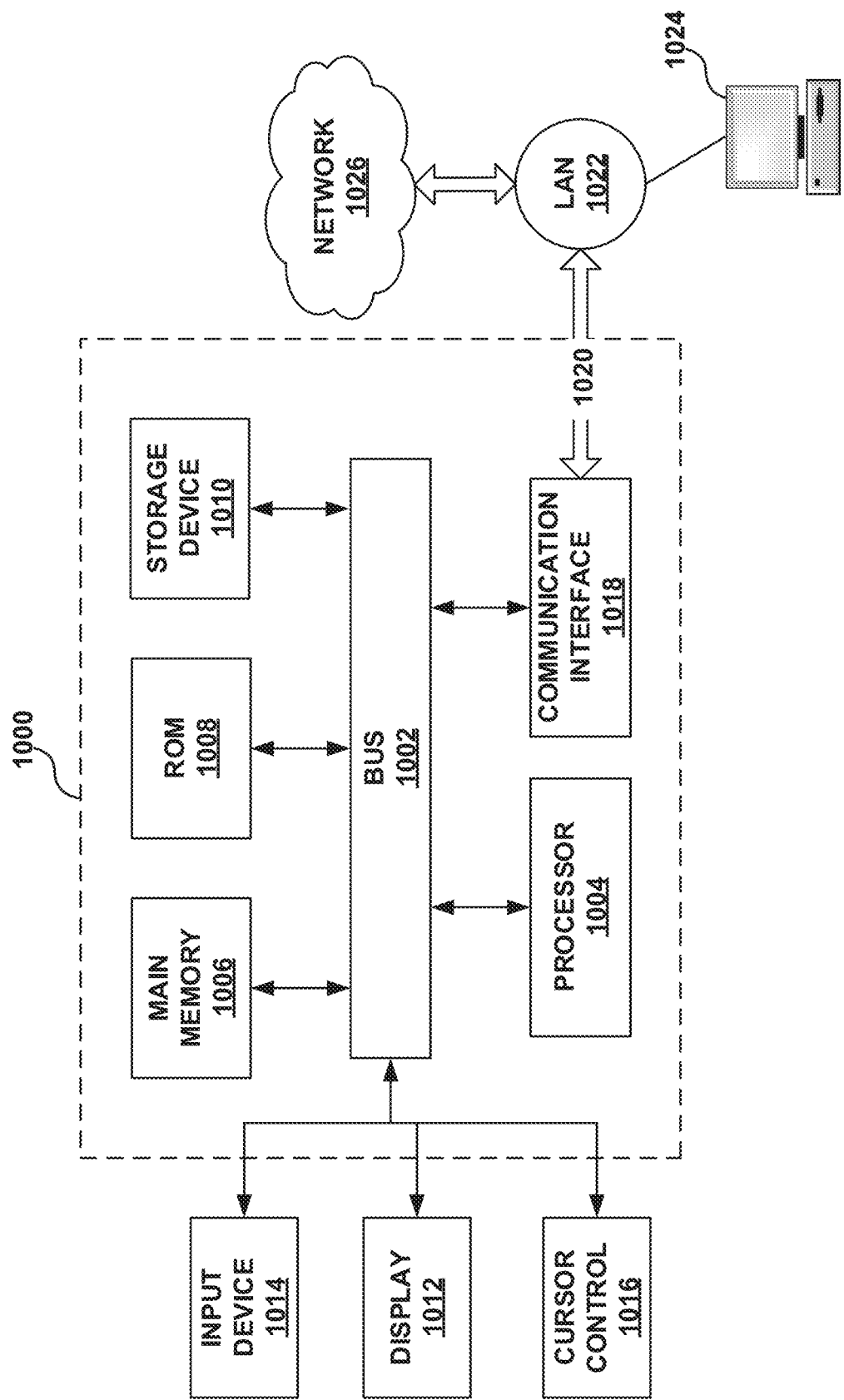
FIG. 9 illustrates an example computing module that may be used in implementing features of various embodiments.

FIG. 9 illustrates a computer system 1000 upon which example embodiments according to the present disclosure can be implemented. Computer system 1000 can include a bus 1002 or other communication mechanism for communicating information, and a processor 1004 coupled to bus 1002 for processing information. Computer system 1000 may also include main memory 1006, such as a random access memory (RAM) or other dynamic storage device, coupled to bus 1002 for storing information and instructions to be executed by processor 1004. Main memory 1006 can also be used for storing temporary variables or other intermediate information during execution of instructions to be executed by processor 1004. Computer system 1000 may further include a read only memory (ROM) 1008 or other static storage device coupled to bus 1002 for storing static information and instructions for processor 1004. A storage device 1010, such as a magnetic disk or optical disk, may additionally be coupled to bus 1002 for storing information and instructions.

Computer system 1000 can be coupled via bus 1002 to a display 1012, such as a cathode ray tube (CRT), liquid crystal display (LCD), active matrix display, light emitting diode (LED)/organic LED (OLED) display, digital light processing (DLP) display, or plasma display, for displaying information to a computer user. An input device 1014, such as a keyboard including alphanumeric and other keys, may be coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to some embodiments, control of one or more components of a GW, may be provided by computer system 1000 in response to processor 1004 executing an arrangement of instructions contained in main memory 1006. Such instructions can be read into main memory 1006 from another computer-readable medium, such as storage device 1010. Execution of the arrangement of instructions contained in main memory 1006 causes processor 1004 to perform one or more processes described herein. One or more processors in a multi-processing arrangement may also be employed to execute the instructions contained in main memory 1006. In alternative embodiments, hard-wired circuitry is used in place of or in combination with software instructions to implement various embodiments.

Computer system 1000 may also include a communication interface 1018 coupled to bus 1002. Communication interface 1018 can provide a two-way data communication coupling to a network link 1020 connected to a local network 1022. By way of example, communication interface 1018 may be a digital subscriber line (DSL) card or modem, an integrated services digital network (ISDN) card, a cable modem, or a telephone modem to provide a data communication connection to a corresponding type of telephone line. As another example, communication interface 1018 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1018 sends and receives electrical, electromagnetic, or optical signals that carry digital data streams representing various types of information. Further, communication interface 1018 may include peripheral interface devices, such as a Universal Serial Bus (USB) interface, a PCMCIA (Personal Computer Memory Card International Association) interface, etc.

Network link 1020 typically provides data communication through one or more networks to other data devices. By way of example, network link 1020 can provide a connection through local network 1022 to a host computer 1024, which has connectivity to a network 1026 (e.g. a wide area network (WAN) or the global packet data communication network now commonly referred to as the "Internet") or to data equipment operated by service provider. Local network 1022 and network 1026 may both use electrical, electromagnetic, or optical signals to convey information and instructions. The signals through the various networks and the signals on network link 1020 and through communication interface 1018, which communicate digital data with computer system 1000, are example forms of carrier waves bearing the information and instructions.

Computer system 1000 may send messages and receive data, including program code, through the network(s), network link 1020, and communication interface 1018. In the Internet example, a server (not shown) might transmit requested code belonging to an application program for implementing an embodiment of the present disclosure through network 1026, local network 1022 and communication interface 1018. Processor 1004 executes the transmitted code while being received and/or store the code in storage device 1010, or other non-volatile storage for later execution. In this manner, computer system 1000 obtains application code in the form of a carrier wave.

The term "computer-readable medium" as used herein refers to any medium that participates in providing instructions to processor 1004 for execution. Such a medium may take many forms, including but not limited to non-volatile media, volatile media, and transmission media. Non-volatile media include, for example, optical or magnetic disks, such as storage device 1010. Volatile media may include dynamic memory, such as main memory 1006. Transmission media may include coaxial cables, copper wire and fiber optics, including the wires that comprise bus 1002. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 10:
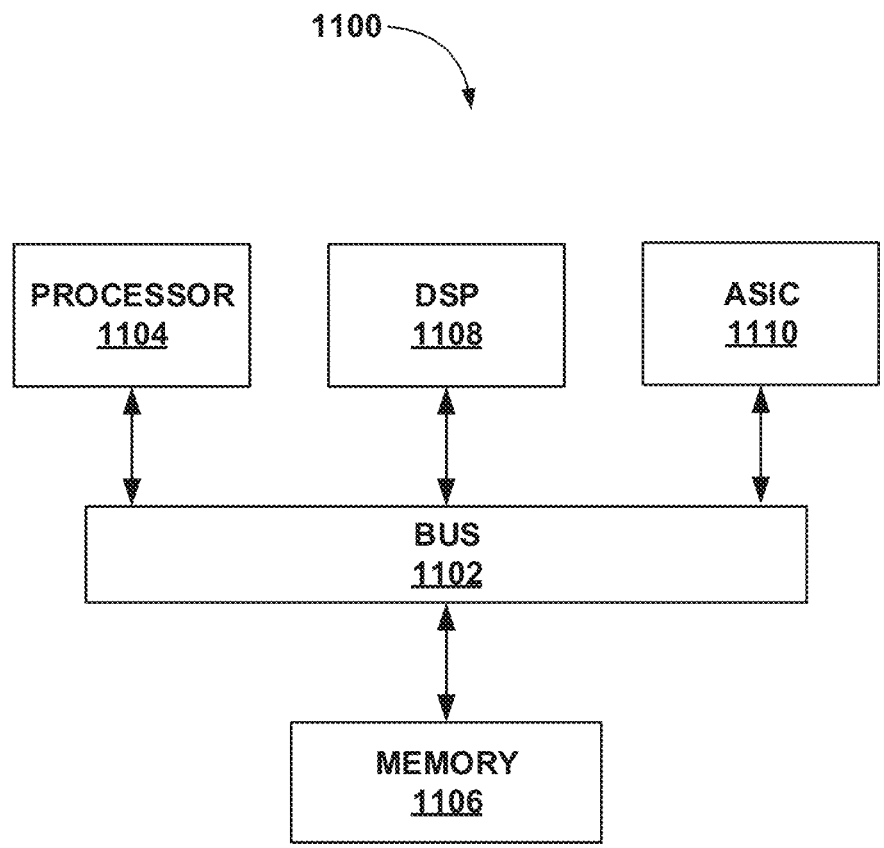
FIG. 10 illustrates an example chip set that can be utilized in implementing architectures and methods in accordance with various embodiments.

FIG. 10 illustrates a chip set 1100 in which embodiments of the disclosure may be implemented. Chip set 1100 can include, for instance, processor and memory components described with respect to FIG. 9 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1100 includes a communication mechanism such as a bus 1002 for passing information among the components of the chip set 1100. A processor 1104 has connectivity to bus 1102 to execute instructions and process information stored in a memory 1106. Processor 1104 includes one or more processing cores with each core configured to perform independently. A multi-core processor enables multiprocessing within a single physical package. Examples of a multi-core processor include two, four, eight, or greater numbers of processing cores. Alternatively or in addition, processor 1104 includes one or more microprocessors configured in tandem via bus 1102 to enable independent execution of instructions, pipelining, and multithreading. Processor 1004 may also be accompanied with one or more specialized components to perform certain processing functions and tasks such as one or more digital signal processors (DSP) 1108, and/or one or more application-specific integrated circuits (ASIC) 1110. DSP 1108 can typically be configured to process real-world signals (e.g., sound) in real time independently of processor 1104. Similarly, ASIC 1110 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1104 and accompanying components have connectivity to the memory 1106 via bus 1102. Memory 1106 includes both dynamic memory (e.g., RAM) and static memory (e.g., ROM) for storing executable instructions that, when executed by processor 1104, DSP 1108, and/or ASIC 1110, perform the process of example embodiments as described herein. Memory 1106 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 1000. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of beam assignment in a digital payload satellite network including a first gateway earth station (GW) and a second GW, the method comprising:
    for the second GW, configuring a virtual beam corresponding to a physical spot beam of the digital payload satellite that serves a plurality of terminals, wherein at least during configuration of the virtual beam, the first GW serves the plurality of terminals and a digital payload of the satellite directs communications with terminals within the physical spot beam to the first GW; and
    after configuring the virtual beam for the second GW, serving one or more of the plurality of terminals from the second GW, wherein the digital payload of the satellite is configured to direct communications with the one or more terminals within the physical spot beam to the second GW while the second GW serves the one or more of the plurality of the terminals,
    wherein the configured virtual beam comprises a plurality of virtual beam parameters, the plurality of virtual beam parameters comprising at least one of: a number and size of inroute and outroute frequency channels, gateway beam and user beam spectrum assignments for inroute and outroute frequency channels, a subscription configuration of virtual network operators (VNOs) served by the physical spot beam, subscription service plans assigned to each of the plurality of terminals, IP addresses assigned to each of the plurality of terminals, and transmission power and timing correction values associated with each of the plurality of terminals.

2. The method of claim 1, wherein the plurality of virtual beam parameters comprise two or more of: the number and size of inroute and outroute frequency channels, gateway beam and user beam spectrum assignments for inroute and outroute frequency channels, the subscription configuration of virtual network operators (VNOs) served by the physical spot beam, subscription service plans assigned to each of the plurality of terminals, IP addresses assigned to each of the plurality of terminals, and transmission power and timing correction values associated with each of the plurality of terminals.

3. The method of claim 1, further comprising:
    physically deploying the second GW prior to configuring the virtual beam; and
    performing readiness testing on the second GW to determine that the second GW is ready to serve the physical spot beam, wherein the digital payload of the satellite is reconfigured after performing readiness testing.

4. The method of claim 3, wherein a radio frequency transmitter of the second GW is muted during readiness testing, and wherein performing readiness testing comprises:
    redirecting transmissions at the second GW to one or more test terminals located at the second GW; and
    testing inroute and outroute components of the second GW using the one or more test terminals.

5. The method of 1, wherein configuring the virtual beam comprises: configuring the second GW to serve a spectrum of the user spot beam served by the first GW during configuration of the virtual beam.

6. The method of claim 1, further comprising: using the configured virtual beam to perform readiness testing on the second GW while the first GW serves the plurality of terminals.

7. The method of claim 6, wherein performing readiness testing comprises: remapping a portion of the spectrum of the physical spot beam from the first GW to the second GW.

8. The method of claim 5, wherein the method further comprises: prior to the second GW serving the one or more of the plurality of terminals, remapping the spectrum of the physical spot beam from the first GW to the second GW.

9. The method of claim 1, wherein configuring the virtual beam comprises:
    configuring the virtual beam at a network management system (NMS); and
    configuring equipment of the second GW to the virtual beam by loading virtual beam parameters of the virtual beam into the second GW equipment.

10. The method of claim 1, wherein moving the plurality of terminals from the first GW to the second GW: comprises:
    associating the plurality of terminals with the second GW; and
    assigning new IP addresses to the plurality of terminals that were served on dynamic IP address plans by the first GW.

11. The method of claim 10, wherein a subset of the plurality of terminals were served on a static IP address plan by the first GW, wherein an IP address of each of the subset of the plurality of terminals does not change when the plurality of terminals are moved from the first GW to the second GW.

12. The method of claim 11, wherein configuring the virtual beam comprises configuring static IP address pools on the second GW that are the same as static IP address pools utilized by the first GW to serve the plurality of terminals.

13. The method of claim 1, wherein configuring the virtual beam comprises: configuring the second GW to serve additional spectrum provided to the physical spot beam by the digital payload.

14. A method, comprising:
    for a first gateway earth station (GW), configuring, at a network management system (NMS), a first virtual beam corresponding to a physical spot beam of a digital payload satellite that serves a plurality of terminals;
    for a second GW, configuring, at the NMS, a second virtual beam corresponding to the physical spot beam, wherein the configured first virtual beam and configured second virtual beam are stored at a database of the NMS;
    serving one or more of the plurality of the terminals from the first GW with the first configured virtual beam or serving one or more of the plurality of the terminals from the second GW with the second configured virtual beam;
    loading virtual beam parameters of the first virtual beam into equipment of the first GW; and
    loading virtual beam parameters of the second virtual beam into equipment of the second GW.

15. A method, comprising:
    for a first gateway earth station (GW), configuring a first virtual beam corresponding to a physical spot beam of a digital payload satellite that serves a plurality of terminals;
    for a second GW, configuring a second virtual beam corresponding to the physical spot beam; and
    serving one or more of the plurality of the terminals from the first GW with the first configured virtual beam or serving one or more of the plurality of the terminals from the second GW with the second configured virtual beam, wherein the configured first virtual beam and the configured second virtual beam each comprise a plurality of virtual beam parameters, the plurality of virtual beam parameters comprising two or more of: a number and size of inroute and outroute frequency channels, gateway beam and user beam spectrum assignments for inroute and outroute frequency channels, a subscription configuration of virtual network operators (VNOs) served by the physical spot beam, subscription service plans assigned to each of a plurality of terminals served by the spot beam, IP addresses assigned to each of a plurality of terminals served by the spot beam, and transmission power and timing correction values associated with each of a plurality of terminals served by the spot beam.

16. The method of claim 15, further comprising: configuring diverse terminals for the first GW and the second GW, wherein the diverse terminals are configured to communicate with the first GW over the physical spot beam using a first frequency carrier and communicate with the second GW over the physical spot beam using a second frequency carrier.

17. The method of claim 16, wherein the diverse terminals maintain the same IP address when communicating with the first GW or the second GW.

18. The method of claim 16, wherein configuring each of the diverse terminals comprises: designating one of the first GW or the second GW as a primary GW; and designating one of the first GW or the second GW as a secondary GW.

19. The method of claim 15, further comprising: configuring network security keys corresponding to the physical spot beam at the first GW and the second GW, wherein the same network security keys are configured at each of the first GW and the second GW.

20. The method of claim 15, wherein the plurality of virtual beam parameters of the first virtual beam and the second virtual beam each comprise: gateway beam and user beam spectrum assignments for inroute and outroute frequency channels corresponding to the physical spot beam, wherein the user beam spectrum assignments are the same for the first virtual beam and the second virtual beam.

21. The method of claim 15, wherein the plurality of virtual beam parameters of the first virtual beam and the second virtual beam each comprise: gateway beam and user beam spectrum assignments for inroute and outroute frequency channels corresponding to the physical spot beam, wherein the user beam spectrum assignments are different for the first virtual beam and the second virtual beam.

22. A system comprising:
a first satellite gateway earth station (GW) communicatively coupled to a digital payload satellite and one or more of a plurality of terminals, wherein the digital payload satellite generates a physical spot beam that provides satellite network coverage to the plurality of terminals, the first GW configured with a first virtual beam to serve a first part of the spot beam's spectrum, the first part of the spot beam's spectrum corresponding to a first plurality of frequency carriers that are used by one or more of the plurality of terminals to communicate over the satellite network with the first GW; and
a second GW communicatively coupled to the digital payload satellite and one or more of the plurality of terminals; the second GW configured with a second virtual beam to serve a second part of the spot beam's spectrum, the second part of the spot beam's spectrum corresponding to a second plurality of frequency carriers that are used by one or more of the plurality of terminals to communicate over the satellite network with the second GW.

23. The system of claim 20, wherein the plurality of terminals comprise a plurality of diverse terminals, wherein the plurality of diverse terminals are configured to communicate with the first GW using the first plurality of frequency carriers and to communicate with the second GW using the second plurality of frequency carriers.

* * * * *